(12) United States Patent
McKay

(10) Patent No.: US 7,377,001 B2
(45) Date of Patent: *May 27, 2008

(54) GROOMING/CLEANING APPARATUS

(75) Inventor: William D. McKay, Grand Blanc, MI (US)

(73) Assignee: The Hartz Mountain Corporation, Secaucus, NJ (US)

( * ) Notice: Subject to any disclaimer, the term of this patent is extended or adjusted under 35 U.S.C. 154(b) by 108 days.

This patent is subject to a terminal disclaimer.

(21) Appl. No.: 11/443,881

(22) Filed: May 31, 2006

(65) Prior Publication Data

US 2006/0265822 A1 Nov. 30, 2006

Related U.S. Application Data

(63) Continuation of application No. 10/717,956, filed on Nov. 20, 2003, now abandoned, which is a continuation-in-part of application No. 10/672,909, filed on Sep. 26, 2003, now Pat. No. 7,234,188.

(51) Int. Cl.
  *A46B 7/10* (2006.01)
(52) U.S. Cl. .......................... 15/23; 15/176.6; 15/179; 15/187; 15/230.19; 15/231
(58) Field of Classification Search ............ 15/23, 15/104.002, 176.1, 176.6, 179, 186–188, 15/202, 230.19, 231, 232
See application file for complete search history.

(56) References Cited

U.S. PATENT DOCUMENTS

| 717,377 | A |   | 12/1902 | Flanders |       |
|---|---|---|---|---|---|
| 1,179,297 | A | * | 4/1916 | Fischer | ............ 15/211 |
| 1,625,537 | A | * | 4/1927 | Gullickson | ........... 15/176.1 |
| 1,783,151 | A | * | 11/1930 | McArthur | ........... 15/244.1 |
| 2,127,886 | A |   | 8/1938 | Plon |       |
| 2,156,744 | A | * | 5/1939 | Smith | ............ 451/501 |
| 2,363,647 | A |   | 11/1944 | Cosin |       |
| 2,529,927 | A |   | 11/1950 | Fisk |       |
| 2,694,826 | A |   | 11/1954 | Blakely |       |
| 2,888,698 | A |   | 6/1959 | Kaye et al. |       |
| 2,920,334 | A |   | 1/1960 | Keller |       |
| 2,922,180 | A |   | 1/1960 | Render |       |
| 3,011,499 | A |   | 12/1961 | Tajan |       |
| 3,034,376 | A |   | 5/1962 | Gonzalez |       |
| 3,056,154 | A |   | 10/1962 | Neal |       |
| 3,060,485 | A |   | 10/1962 | Butter et al. |       |
| 3,102,544 | A |   | 9/1963 | Keegan et al. |       |
| 3,128,487 | A |   | 4/1964 | Vallis |       |
| 3,158,887 | A |   | 12/1964 | Kanbar et al. |       |
| 3,299,461 | A |   | 1/1967 | Marks |       |
| 3,307,211 | A |   | 3/1967 | Gaines |       |
| 3,373,457 | A |   | 3/1968 | Rouch, Jr. |       |
| 3,500,490 | A |   | 3/1970 | Teren |       |

(Continued)

*Primary Examiner*—Mark Spisich
(74) *Attorney, Agent, or Firm*—Gottlieb, Rackman & Reisman

(57) ABSTRACT

A cleaning apparatus includes a handle, a support coupled to the handle and a cleaning element mountable on the support. The support is fixed to the handle or is rotatably coupled to the handle for rotation by a drive motor mounted in the handle. The cleaning element may include bristles extending from a flexible mat fixed about the support or about a core mountable on the support. A cleaning sheet is windable about the support, the core or the cleaning element, including over and through the bristles, for dual cleaning action.

6 Claims, 16 Drawing Sheets

U.S. PATENT DOCUMENTS

| | | | |
|---|---|---|---|
| 3,665,543 A | 5/1972 | Nappi |
| 3,742,547 A | 7/1973 | Sohmer |
| 3,755,847 A | 9/1973 | Liebscher |
| 3,833,008 A | 9/1974 | Blackett, Jr. |
| 3,890,984 A | 6/1975 | Lesetar |
| 4,062,083 A | 12/1977 | McKay |
| 4,107,811 A | 8/1978 | Imsande |
| 4,244,587 A | 1/1981 | Schweizer |
| 4,307,739 A | 12/1981 | Chern |
| 4,357,730 A | 11/1982 | Lex |
| 4,361,923 A | 12/1982 | McKay |
| 4,399,579 A | 8/1983 | McKay |
| 4,422,201 A | 12/1983 | McKay |
| 4,500,939 A | 2/1985 | Gueret |
| 4,517,703 A | 5/1985 | Koke |
| 4,603,448 A | 8/1986 | Middleton et al. |
| 4,727,616 A | 3/1988 | Kucera et al. |
| 4,742,547 A | 5/1988 | Watanabe |
| 4,850,073 A | 7/1989 | Preuss |
| 4,856,541 A | 8/1989 | Kellett et al. |
| 4,884,688 A | 12/1989 | Hurst |
| 4,905,337 A | 3/1990 | McKay |
| 5,002,075 A | 3/1991 | Kellett et al. |
| 5,027,465 A | 7/1991 | McKay |
| D320,680 S | 10/1991 | Stetson et al. |
| 5,052,071 A | 10/1991 | Halm |
| 5,261,426 A | 11/1993 | Kellett et al. |
| D342,610 S | 12/1993 | Stetson et al. |
| 5,410,772 A | 5/1995 | Lewis |
| D363,214 S | 10/1995 | Parola et al. |
| 5,477,582 A * | 12/1995 | Yamashita ................ 15/231 |
| 5,519,912 A | 5/1996 | Kawamura |
| 5,600,865 A | 2/1997 | Morrison |
| 5,651,158 A | 7/1997 | Halm |
| 5,819,989 A | 10/1998 | Saraceni |
| 5,862,563 A | 1/1999 | Hartmann |
| 5,870,790 A | 2/1999 | Root et al. |
| 5,878,457 A | 3/1999 | Cox et al. |
| 5,887,600 A | 3/1999 | Wilk |
| 5,890,249 A | 4/1999 | Hoffman |
| 5,890,255 A | 4/1999 | Robinson |
| 5,904,150 A | 5/1999 | Caristo et al. |
| 6,006,393 A | 12/1999 | Lynch et al. |
| 6,014,788 A | 1/2000 | Jaffri |
| 6,021,542 A | 2/2000 | Norman |
| 6,029,307 A | 2/2000 | Baudoin |
| 6,055,695 A | 5/2000 | McKay, Jr. |
| 6,070,597 A | 6/2000 | Motherhead |
| 6,098,635 A | 8/2000 | Marino |
| 6,112,362 A | 9/2000 | Parko et al. |
| 6,127,014 A | 10/2000 | McKay, Jr. |
| 6,170,107 B1 | 1/2001 | George et al. |
| 6,230,716 B1 | 5/2001 | Minoletti |
| 6,280,757 B1 | 8/2001 | McAfee et al. |
| 6,298,517 B1 | 10/2001 | McKay |
| 6,325,070 B1 | 12/2001 | Tyroler et al. |
| 6,405,403 B1 | 6/2002 | McKay |
| 6,493,899 B1 | 12/2002 | Hintz et al. |
| 6,502,585 B1 | 1/2003 | Mazzei et al. |
| 2002/0148061 A1 * | 10/2002 | Tanaka et al. ............ 15/229.3 |
| 2003/0116171 A1 | 6/2003 | Loveless |
| 2003/0229958 A1 | 12/2003 | Thompson et al. |
| 2004/0181892 A1 | 9/2004 | Chen |

* cited by examiner

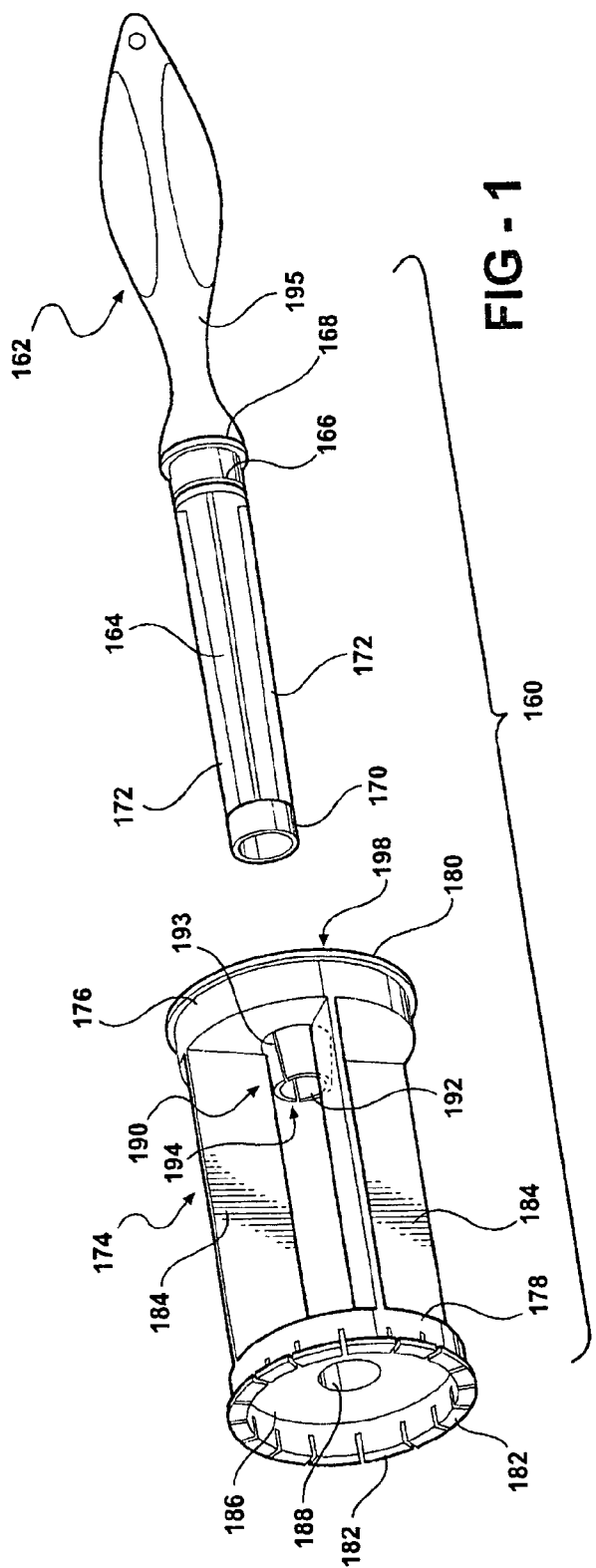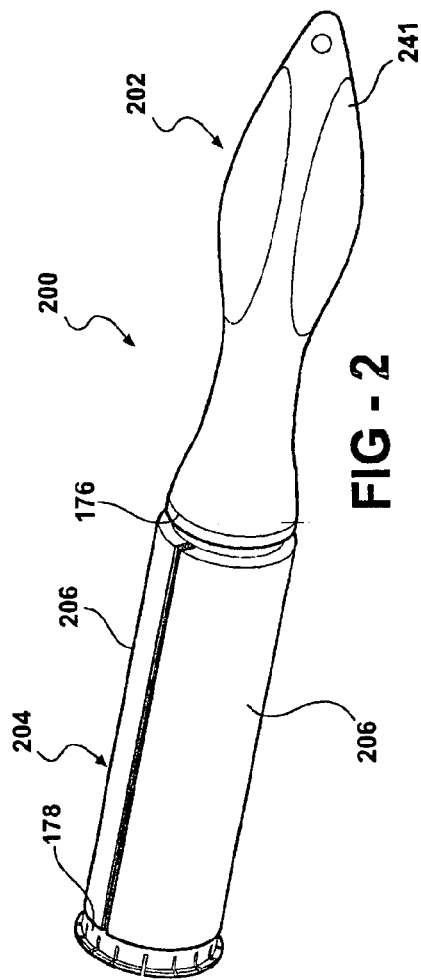

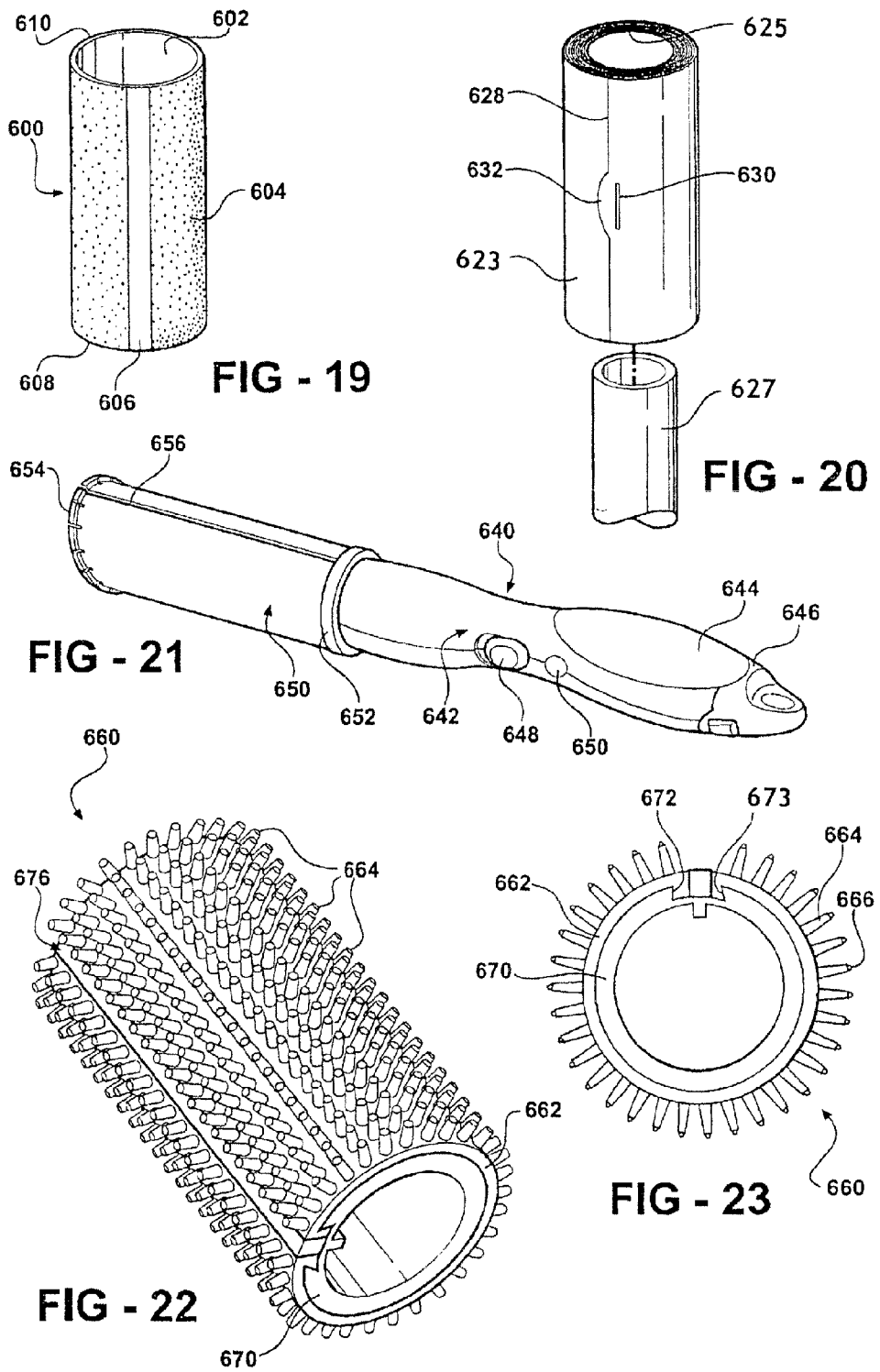

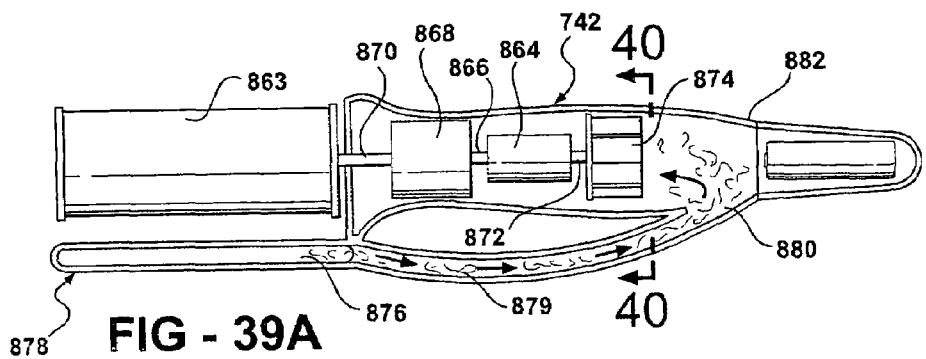
FIG - 39A
FIG - 40
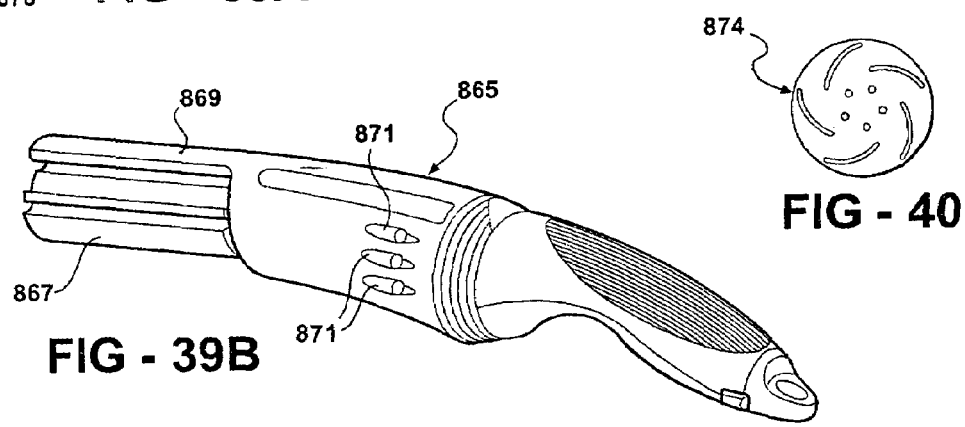
FIG - 39B
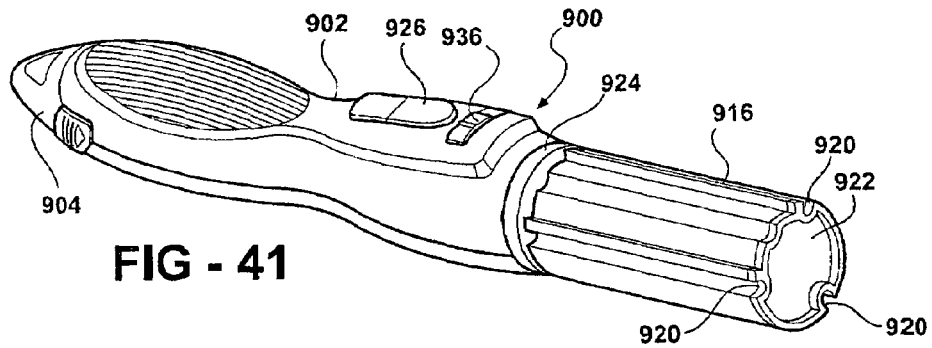
FIG - 41
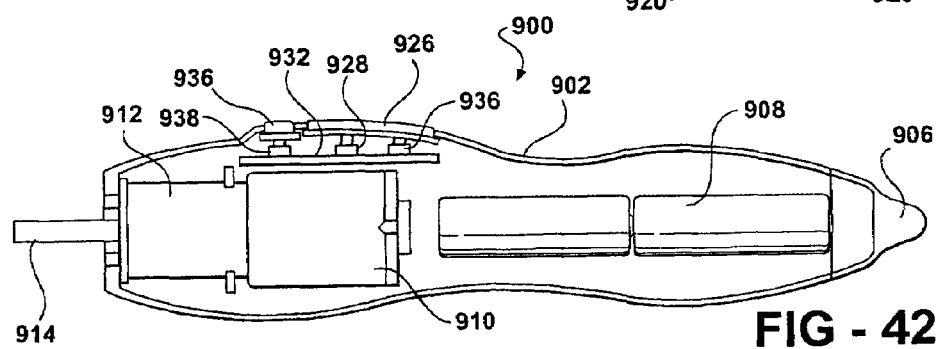
FIG - 42

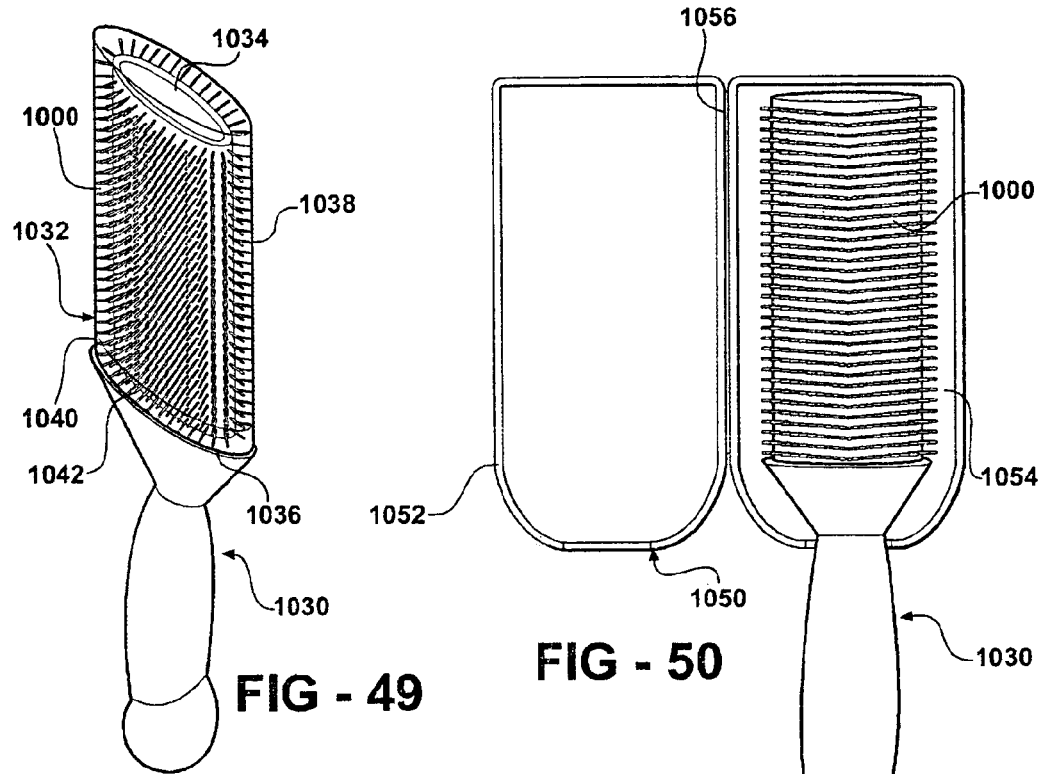
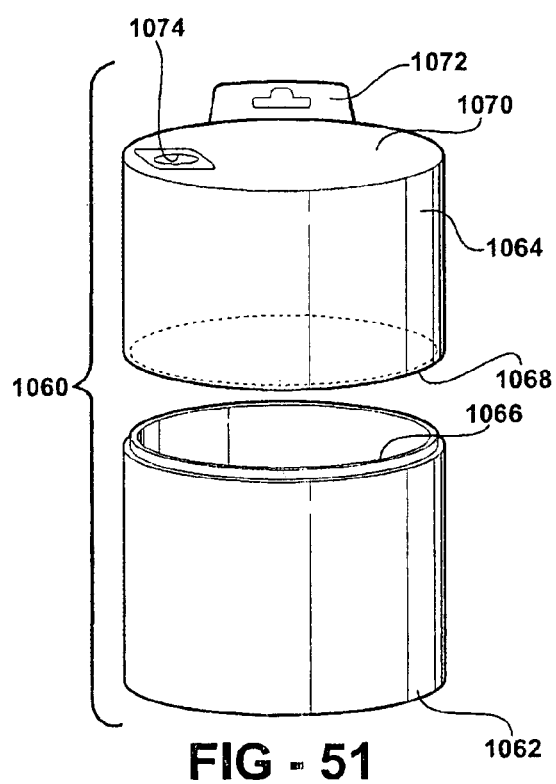
FIG - 49
FIG - 50
FIG - 51

GROOMING/CLEANING APPARATUS

CROSS REFERENCE TO CO-PENDING APPLICATION

This application is a continuation of application Ser. No. 10/717,956, filed Nov. 20, 2003 now abandoned entitled GROOMING/CLEANING APPARATUS, which is a continuation-in-part of application Ser. No. 10/672,909 filed Sep. 26, 2003 now U.S. Pat. No. 7,234,188, and entitled Lint Removal Apparatus with Edge Orientation, the contents of which are incorporated herein in their entirety.

BACKGROUND

This invention relates to cleaning apparatus and, in particular, to cleaning or grooming apparatus for pets.

Such pressure sensitive adhesive tapes are used for picking up undesired particles from fabric, floor and other surfaces. More specifically, the pressure sensitive adhesive tape roll is provided with an adhesive formulated in such a way to efficiently pick up and hold foreign particles over which it is rolled and then optionally cleaned either by rinsing the particles away from the adhesive or peeling the soiled outermost layer away using one of the peeling systems in the art.

Some devices of the prior art illustrate the use of tape rolls which utilize specific perforation, slit, and non-adhesive edge patterns to promote easy sheet removal. Some of the tape utilizes creped paper, flat back paper, or silicone treated paper, which when becoming wet deteriorates. Other lint removers use embossed film with adhesive coating to build the roll's diameter.

Other devices known in the art utilize a rubber like sticky washable coating that is extruded onto a core and then placed onto a lint roller assembly. While this provides for cleaning the sticky roll with water it does not provide the peeling option. Even with a dry edge or pop-up tab, the tight wound nature of the lint roll and the potentially long time over which a single roll is used can cause even the dry edges to stick to the underlying sheet.

As with any roll of tape, locating the end of the tape can be a time consuming task in addition to the difficulty in prying an edge of the end away from the remainder of the tape roll.

Lint rollers typically have a lint roll rotatably mounted on a body from which a handle extends. The lint roll is rolled across a surface to be cleaned. Centrifugal force resulting from the speed at which the user moves the roller across the surface frequently causes the roll to continue to rotate even when after separation from a surface. As the distance the user moves the roll across a surface can vary from application to application and due to centrifugal force, the free end of the tape roll continually changes position about the circumference of the roll with respect to the underlying body and handle. This makes it difficult to locate the ever-changing location of the free end in order to remove the soiled outermost sheet from the roll.

Thus, it would be desirable to provide a lint roller apparatus which has an edge orienting capability in which the free end of the tape roll is always oriented in the same location with respect to the handle and roller body or swivel. It would also be desirable to provide a lint roller apparatus in which the free end of the lint roll can be oriented to an established, constant position by the user after a cleaning operation. It would also be desirable to provide a lint roller apparatus which has an automatic rotation means for automatically rotating the cleaning element with respect to the handle. It would also be desirable to provide a lint roller apparatus which includes a means for prying the free edge of the outermost sheet of the tape roll from the underlying sheet during rotation of the roll.

SUMMARY

The present invention is a cleaning apparatus including a cleaning element, support means for carrying the cleaning element, and a handle coupled to the cleaning element support. In one aspect, the support includes a handle and a spindle axially fixedly extending from the handle, a rotatable member rotatably mounted on the spindle, and the cleaning element mounted on the rotatable member.

In another aspect, the rotating means includes power drive means, carried in the support, the drive means having a rotatable output shaft, a power source selectively coupled to the drive means, a rotatable member coupled to and rotatable with the cleaning element, and means for coupling the output shaft to the rotatable member.

The coupling means may be a gear transmission.

The present invention also includes a powered drive means for rotating the support carrying the lint roll for ease in effecting cleaning operation as well as simplifying the removal of a dirty outermost sheet from the roll.

In another aspect, the cleaning element is a mat having an exterior surface formed with cleaning members. The cleaning members may include a plurality of bristles extending from the mat. The bristles may also be saw-toothed shaped projections arranged with alternating peaks and valleys.

A sheet may be mounted over the bristles. The sheet may be a fabric sheet, such as a non-woven fabric which can carry cleaning, deodorizing, medicament or other cleaning or grooming solutions for application to a pet or other surface.

In another aspect, means are removably mountable over the mat and between the bristles to remove loose articles collected by the bristles when the means is removed from the mat. In one aspect, the means is apertures formed in the sheet or in a cage so as to enable the cage to be mountable over the bristles. The means may also be a mesh-net having intersecting threads disposable between adjacent bristles.

Clamp means may also be provided on the core, the support or the mat or separably attachable to the support or core to clamp the free end of the sheet to the support or core.

In another aspect, vacuum generating means are provided in the handle for generating an inward air flow through a conduit coupled to the handle. The conduit is disposed in fluid communication with the vacuum generating means in a debris collection chamber coupled to the handle.

In another aspect, the cleaning apparatus includes a cleaning element, support means for supporting the cleaning element, and a handle rotatably coupled to the cleaning element support. The cleaning element including a sheet disposed about the support.

In another aspect, the cleaning apparatus is a brush including a handle. Bristles are carried on the brush. A sheet is disposed about the bristles. The sheet may be dry or pre-moistened and provided with a cleaning, deodorizing or medicament composition.

The grooming/cleaning apparatus of the present invention provides numerous advantages over previously devised cleaning apparatus, especially cleaning or grooming apparatus devised for cleaning the coats of pets. The present apparatus provides an effective means for cleaning the coats of pets and separately or at the same time with the cleaning operation, applying a separate cleaning, deodorizing or medicament solution to the pet.

BRIEF DESCRIPTION OF THE DRAWING

Referring now to the drawings there is depicted a cleaning apparatus which can be advantageously employed to clean and/or groom pets, including dogs, cats, etc.

FIG. 1 is an exploded, perspective view of another aspect of a cleaning apparatus according to the present invention;

FIG. 2 is a perspective view of another aspect of a cleaning apparatus according to the present invention;

FIG. 19 is a perspective view of another aspect of a cleaning element or mat;

FIG. 20 is an exploded, perspective view of another aspect of a cleaning element or mat according to the present invention;

FIG. 21 is a perspective view of another aspect of a handle and spindle according to the present invention;

FIG. 22 is a perspective view of another aspect of a cleaning element according to the present invention;

FIG. 23 is an end view of the cleaning element shown in FIG. 22;

FIG. 39A is a side-elevational view, with a portion of the cover removed, showing another aspect of a cleaning apparatus according to the present invention;

FIG. 39B is a perspective view of a modified handle with unitary vacuum means;

FIG. 40 is a cross-sectional view generally taken along line 40-40 in FIG. 39A;

FIG. 41 is a perspective view of another aspect of a cleaning apparatus providing a rotatable spindle according to the present invention;

FIG. 42 is a side elevational view, with a portion of the housing removed, to show the internal components of the cleaning apparatus shown in FIG. 41;

FIG. 49 is an elevational view of a protective cap mountable over a cleaning apparatus of the present invention;

FIG. 50 is an elevational view of another aspect of a protective cap according to the present invention;

FIGS. 51 and 52 depict another aspect of a protective enclosure which can be used to ship, display and use the cleaning apparatus of the present invention.

DETAILED DESCRIPTION

Figure 3:
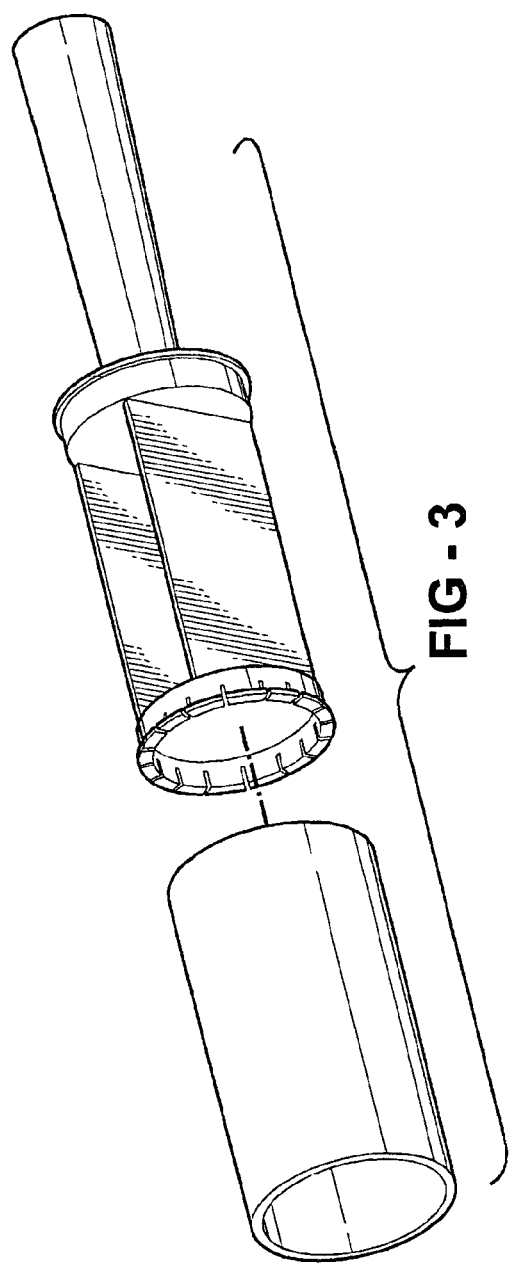
FIG. 3 is an exploded, perspective view of another aspect of a cleaning roller apparatus with orienting capability according to the present invention.
Figure 5:
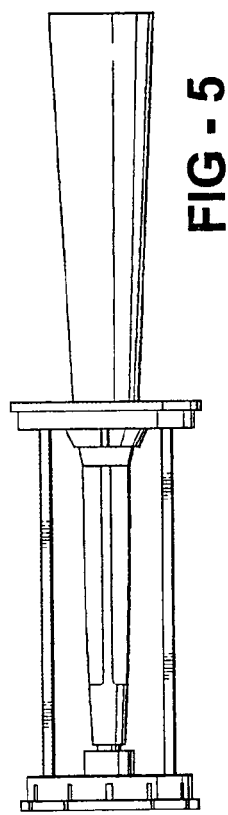
FIG. 5 is a side-elevational view of an assembled apparatus shown in FIGS. 3 and 4.
Figure 4:
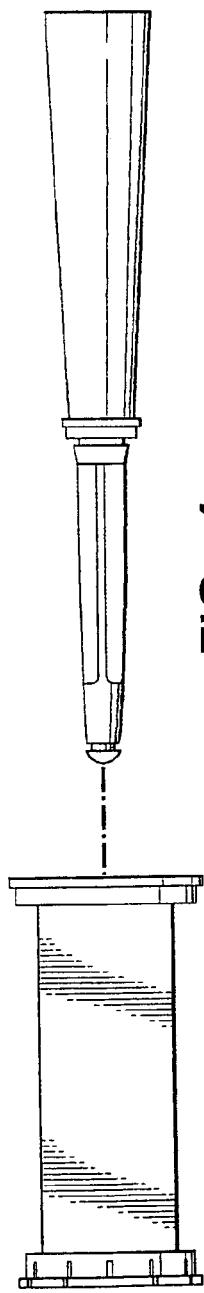
FIG. 4 is an exploded, side-elevational view of the apparatus shown in FIG. 8.

In the apparatus 160 shown in FIG. 1, a handle 162, has a roller cylinder support shaft 164 projecting from one end. The shaft 164 has a pair of raised, annular flanges 166 and 168 which are spaced apart and disposed adjacent to one end of the handle 162. The flanges 166 and 168 define a slot therebetween, the purpose of which will be described hereafter. The opposite end of the shaft 164 terminates in an annular sleeve 170. At least one and, preferably, a plurality of circumferentially spaced ribs 172 extend along the exterior of the roller support 164 between the flange 166 and the sleeve 170

A roller support cylinder 174 is defined by a pair of axially spaced, annular collars 176 and 178. The collar 176 has a raised annular flange 180 extending radially outward from one end. The opposite collar 178 has a plurality of circumferentially spaced fingers 182 extending therefrom and terminating in a radially outward extending end 184 which define lock means for supporting a lint roll 30, not shown, on the cylinder 174. A plurality of straps 184 extend between the collars 176 and 180 to define a substantially cylindrical shape for the roller support 174.

An end cap 186 is formed in the collar 178 and has a central aperture 188 sized to receive the sleeve 170 on the support 164. An interior end cap 190 extends axially from one side of the sleeve 170 and one side of the collar 176 and has a plurality of generally tapered fingers 192 which define a central aperture 194 therebetween for receiving the ribs 172 on the roller spindle 164.

When the roller cylinder 174 is mounted over the spindle 164, the sleeve 170 will engage the end cap 186. The fingers 192 surround the spindle 164 to permit free rotation of the cylinder 174 on the spindle 164.

Another aspect of an apparatus 200 of the present invention is shown in FIGS. 2-5. The lint roller apparatus 200 includes a handle 202 substantially the same as the handles in the previous aspect of the of the present invention.

The handle 202 may be blow molded in one piece or formed as multiple joined pieces.

Figure 6:
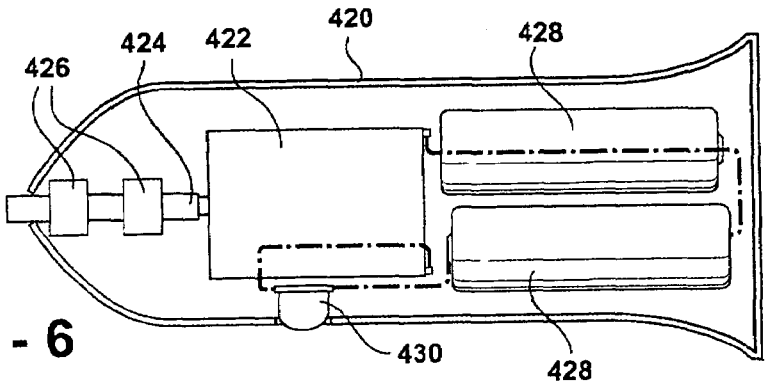
FIG. 6 is a side elevational, pictorial representation of another aspect of a cleaning apparatus according to the present invention.

Likewise, a rotatable spindle 204 is substantially the same as the spindle 164 and cylinder 174 described in conjunction with FIG. 6 except that the plurality of circumferentially spaced, radial straps 184 are replaced by a pair of parallel extending straps 206 which extend between collars 176 and 178. Otherwise, the cylinder 204 functions in the same manner as the cylinder 174 in supporting a lint roll, not shown.

The cylinder could also be forced as two collars on a central axle which is fixed to the drive shaft.

Referring now to FIG. 6, there is shown a pictorial representation of another aspect of a powered drive means mounted in a housing 420 for, when activated, rotating the spindle. In FIG. 6, a drive means 422, such as a DC electric motor is mounted in the housing 420. The output shaft 424 of the motor 422 extends through supports or bearings 426 to an end coupled, integrally or mechanically to the rotatable spindle. A power source, such as storage batteries 428 is contained within the housing 420 and electrically connected to the motor 422 to drive the motor 422 by an on/off switch 430 mounted on the housing 420.

Figure 7:
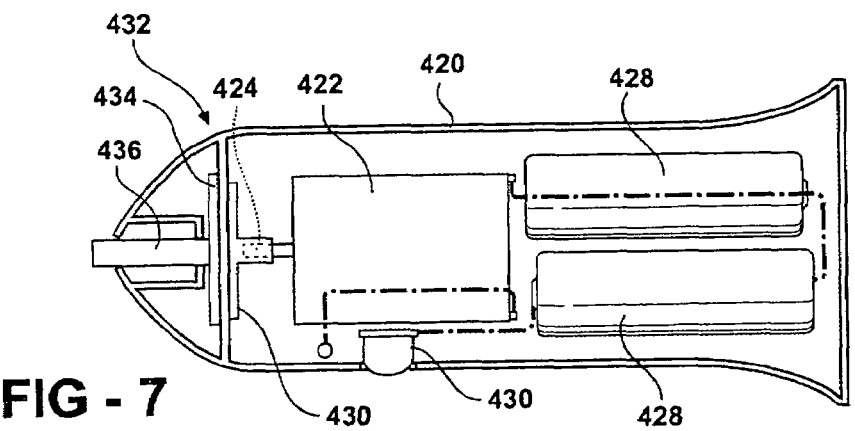
FIG. 7 is a side elevational, pictorial representation of another aspect of a cleaning apparatus according to the present invention.

The drive means shown in FIG. 7 is similar to that of FIG. 6 with similar components depicted by the same reference number.

In this aspect, however, the output shaft 424 of the motor 422 is coupled to one plate 430 of a clutch means 432. The other plate 434 of the clutch 432 is coupled to a shaft 436 which extends to a connection with the rotatable spindle. The clutch 432 allows slip between the plates 430 and 434 if resistance is met during rotation of the shaft 432.

Figure 8:
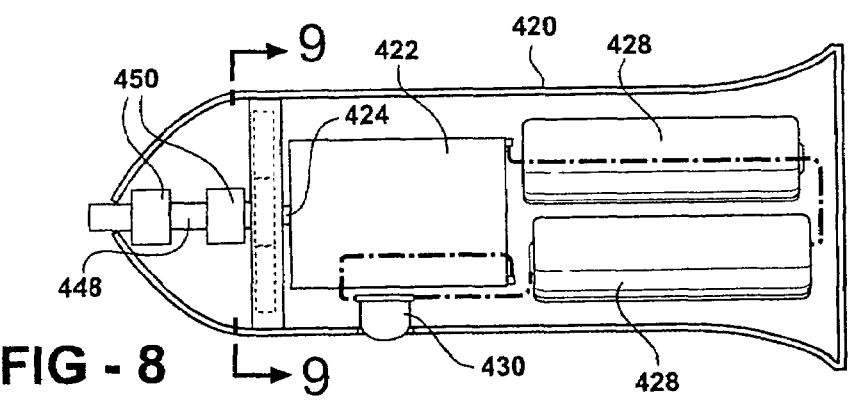
FIG. 8 is a side elevational, pictorial representation of yet another aspect of a cleaning apparatus according to the present invention.
Figure 9:
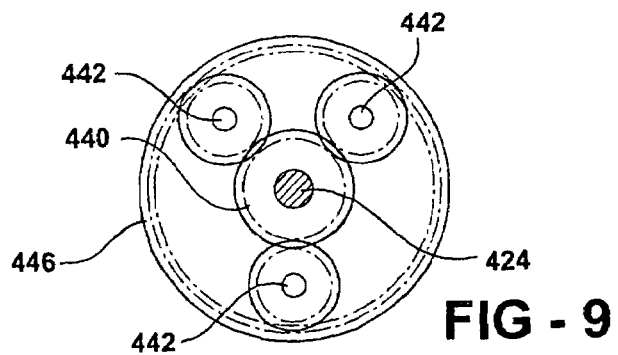
FIG. 9 is a view in the direction of arrows line 9-9 in FIG. 8.

In the apparatus shown in FIGS. 8 and 9, the output shaft 424 of the motor 422 is joined to a central gear 440. A plurality of planetary gears 442 surround and engage the sun gear 440. The planetary gears 442 are in turn coupled to an external ring gear 446. A drive shaft 448 is coupled to the ring gear 442 and supported in bearings 450. The drive shaft 448 is coupled to the rotatable spindle.

Figure 10:
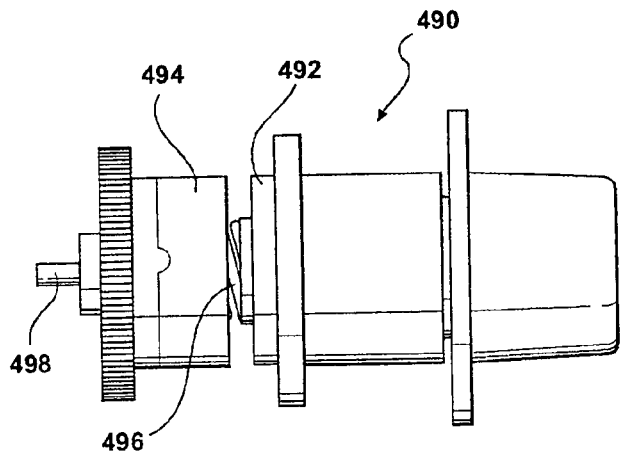
FIG. 10 is a side elevational view of a power transmission means employable in any of the apparatus shown in FIGS. 7-9.

In FIG. 10, an alternate clutch mechanism 490 is illustrated. The clutch mechanism 490 is designed to be used with any of the power drive means, and mounted within a housing 420. An output shaft of the drive motor is coupled to a first clutch plate 492. A second clutch plate 496, moveably spaced from the first clutch plate 492 carries a drive shaft 498 which can be coupled to or integrally formed with a spindle on which the lint roll is mounted.

A compliant means 496 is disposed between the first and second clutch plates 492 and 494. The compliant means 496 may comprise a spring which is unwind able from a first, tightly wound position bringing the first and second clutch plates 492 and 494 into engagement for transmission of drive power from the motor to the drive shaft 498 and a second position in which the compliant means expands to separate the second clutch plate 494 from the first clutch plate 492. Such expansion of the compliant means 496 would occur, for example, if an obstruction, such as an orienting pin, is encountered by the lint roll 30 which substantially hinders or stops rotation while the drive motor is still trying to apply power through the clutch means 490 to the drive shaft 498. In this occurrence, the compliant means 496 expands separating the clutch plates 492 and 494 and disrupting power to the drive shaft 498.

Upon removal of the obstruction, the compliant means 496 can rewind to a first position bringing the second clutch plate 494 back into engagement with the first clutch plate 492.

The above-described aspects of the powered rotatable output shaft from the drive motor or coupling means. This typically is in the form of a rotatable shaft extending outward from one end of the handle assembly which non-rotatably engages a mating socket in the spindle, and/or cleaning element core so as to provide rotation to the spindle or core upon activation of the drive motor. It will also be understood that the present invention also encompasses within its scope an opposite arrangement in which a shaft extends from the spindle or core and engages a socket mounted in the end of the handle which is rotatably coupled to the drive motor, either directly or through a coupling means, such as a gear transmission, etc.

FIGS. 11-15 depict alternate cleaning elements which can be mounted directly onto any of the rotatable spindles described above.

Figure 11:
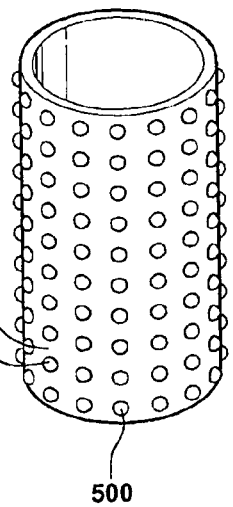
FIGS. 11-13 are perspective views of alternate aspects of a cleaning element which is mountable on the rotatable cylinder of various aspects of the present invention.

The cleaning element 500 in FIG. 11 includes a slightly elastic or expandable mat 508 which carries a plurality of radially outwardly extending nibs or projections 506. The mat 508 is fixed by adhesive or the like to a core which is then mounted on one of the rotatable cylinders in the rotating apparatus described above.

Figure 12:
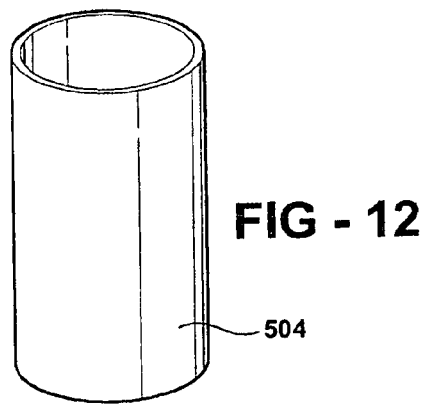

The cleaning element 504 in FIG. 12 depicts a cylindrical mat formed of a non-woven, sponge-like or foam material. The mat may be treated with a no-rinse soap or any cleaning, polishing or disinfecting fluid or a composition activated by water.

Figure 13:
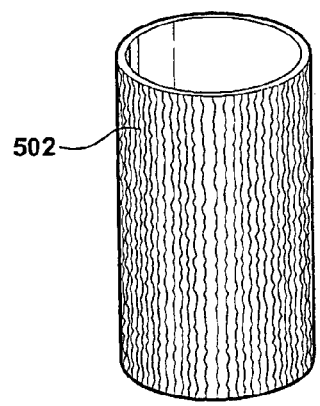

The cleaning element 502 in FIG. 13 depicts a directional fabric in which fibers mounted in a mat are oriented in one direction to pick up lint, debris or hair from pets and fabrics when the cleaning element 504 is mounted about one of the rotatable cylinders as described above and rotated in a first direction. Rotation of the element 504 in the opposite direction can be used to remove the accumulated debris from the element 504 by engagement with a finger, cleaning element or a hood and scraper attached to the body.

Figure 14:
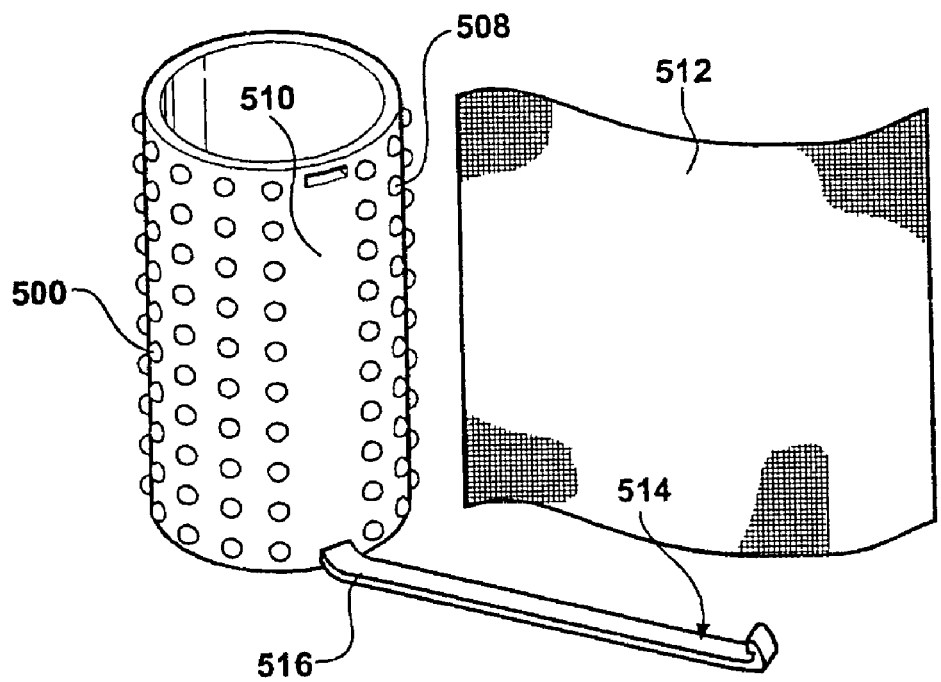
FIGS. 14 and 15 are exploded perspective views of modifications of other aspects of the cleaning element shown in FIGS. 11-13.

FIG. 14 depicts a modification to the cleaning element 500 in which the cleaning element 500 includes a space 510 which is at least partially void of the projections 508. A clamp, such as a hair barrette type clamp 514 is mounted on the mat and has a pivotal bar 516 which is extendable over a substantial portion of the width of the cleaning element 500. A wipe sheet 512 can be wound around the cleaning element 500 and the ends clamped in place by clamping of the pivotal bar 516 and the remainder of the clamp on the cleaning element 500. In this manner, the projections deform the sheet 512 and can be used to massage a pet while at the same time the wipe sheet 512 can be used to remove dirt, hair, dander, etc., from the pet. The wipe sheet, preferably is a non-woven spunlace fabric, 20 gsm to 120 gsm pre-treated with cleanser, conditioner, shine enhancer, medicament, flea and tick preparation. The preparation is either activated by water by the user or pre-moistened and ready to use.

Figure 15:
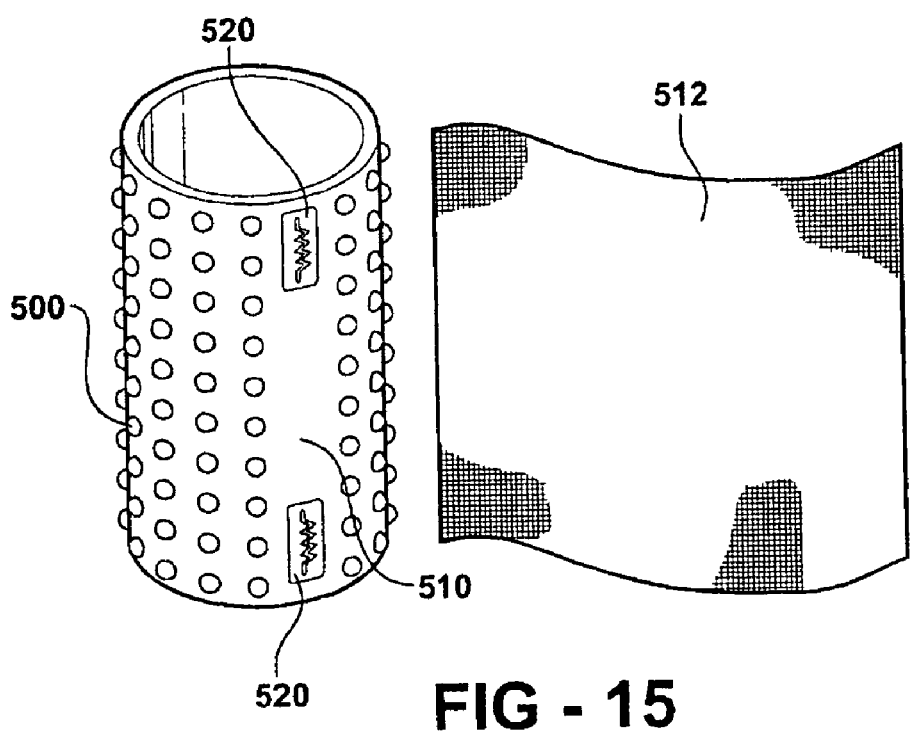

FIG. 15 depicts a similar modification to the cleaning element 500 in which the wipe sheet 512 is clamped on the exterior of the cleaning element 500 by at least one and preferably a plurality of expandable rubber grippers 520 mounted in the cleaning element 500.

Figure 16:
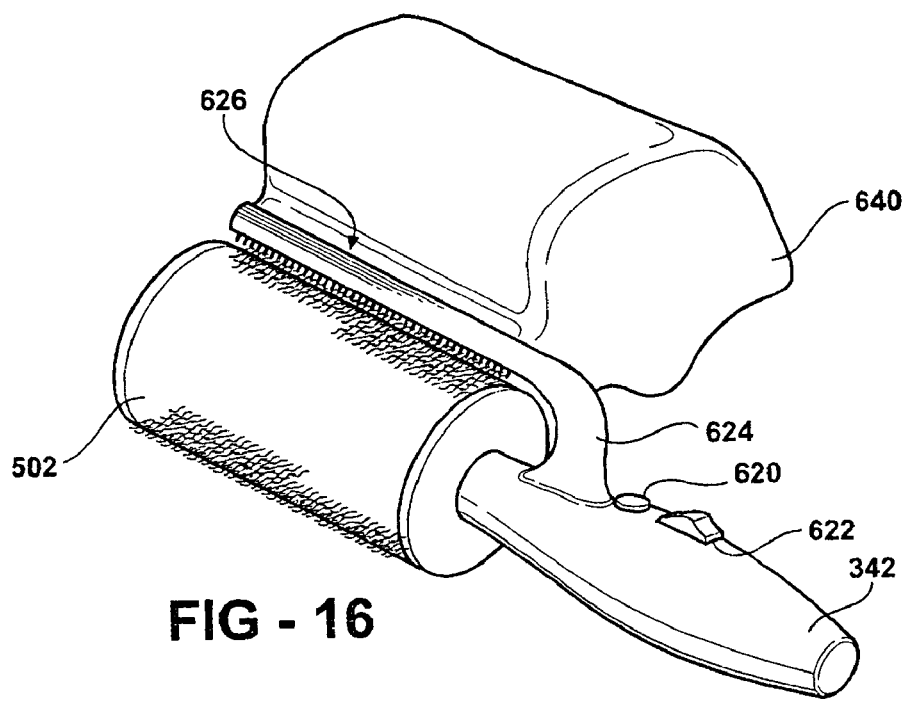
FIGS. 16, 17, and 18 are perspective, front elevational and a bottom view of the hood, respectively, of another aspect of the cleaning apparatus of the present invention.
Figure 17:
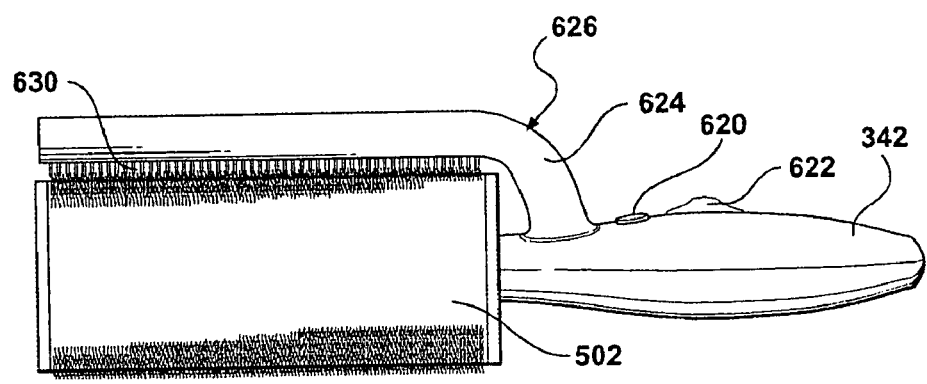
Figure 18:
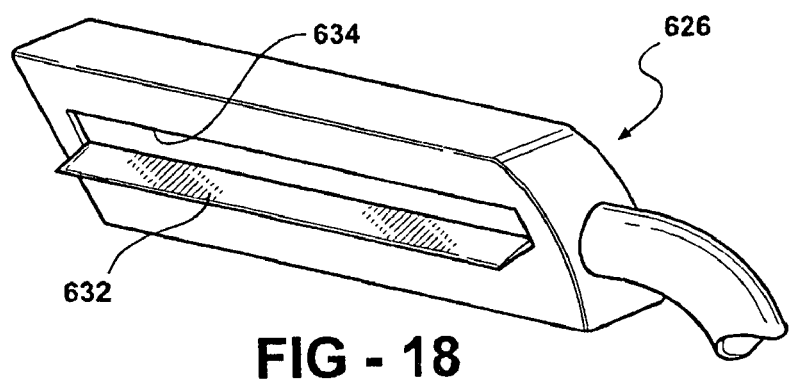

The cleaning apparatus shown in FIGS. 16-18 includes a handle 342 and a rotatable support, not shown, for the directional fabric 502, as described above. The handle is provided, by way of example only, with a first stop/start or on/off switch 620 and a separate forward/reverse switch 622.

In this aspect, an arm 624 is fixed at one end to the handle 342 and is connected at an opposite end to a collection hood or compartment 626. The compartment carries, as shown in FIGS. 17 and 18, an additional cleaning element 630 which may be in the form of a rough fabric sheet as shown in FIG. 17 or a scraper blade 632 in FIG. 18. An opening 634 is formed in the bottom surface of the hood 626 as shown in FIG. 18 and opens to the interior of the hood 626 or to a bag 640 which can be secured at an open end by means of a tie member, elastic, etc., to the hood 626 to receive the debris removed from the directional fabric 502 when the motor contained within the handle 342 is moved in a reverse direction from the normal cleaning direction of rotation.

Referring now to FIG. 19 there is depicted another aspect of a mat or pad 600 useable in the present cleaning apparatus. The mat or pad 600 may include a substantially rigid, generally cylindrical tubular core 602 formed of plastic, paper, etc.

The core 602 may be hollow with opposed open ends or may have one closed end with a central bore for receiving the drive shaft of a drive means or motor, as described hereafter. In addition, the mat or pad 600 may be coreless in that the material forming the mat or pad fills substantially the entire interior of the pad 600.

In this aspect of the mat or pad 600, the mat or pad 600 is formed of a foam or soft flexible fabric material. In the illustrated shape, the mat or pad 600 is in the form of a layer 604 from 1/16" to 1" thick mounted about the core 602. The layer 604 is held on the core 602 by means of a tight winding, adhesive, friction fit, etc.

An uncoated area 606, generally in the form of a slot extending between opposed ends 608 and 610 of the pad 600 is provided laterally on the layer 604 of the pad 600. The uncoated area 606 forms an area for reception of a clamp used to attach the layer 604 to the core 602 or directly to the rotatable member or spindle rotated by a power drive means or motor when the layer 604 is wound directly around the spindle or otherwise applied to the spindle.

In FIG. 20, another aspect of a cleaning element 620 is depicted. In this aspect, the cleaning element 620 is in the form of a fabric or paper wipe which may be dry or pre-moistened with a cleaning composition, such as a cleaning fluid, medication for pet allergies, etc., flea or tick medication, deodorizing compositions, etc.

The fabric or cleaning wipe forming the cleaning element 620 is water insoluble. This means that the fabric does not dissolve in or readily break apart upon immersion in water.

Suitable materials for forming the wipe 620 include non-woven substrates, woven substrates, natural or synthetic sponges, polymeric nets or meshes, etc.

In one aspect, the wipe 620 is formed of a non-woven substrate in which one or more layers are formed of fibers which are not woven into a fabric, but are formed into a sheet, mat or layer. The fibers can be randomly aligned or oriented in primarily one direction. The non-woven substrate can also be formed of a combination of layers of random and directionally oriented fibers.

Non-woven wipe 620 can be formed of a variety of materials. Natural materials include silk fibers, cellulose fibers, wool fibers, camel hair fibers and the like. Cellulose fibers include fiber selected from wood pulp, cotton, hemp, jute, flax, in mixtures thereof. Synthetic materials which can be used to form a non-woven wipe include any fiber selected from the group consisting of acetate, acrylic, cellulose, ester, polyamide, polyester, polyolefin, polyvinyl alcohol, polyurethane foam, in mixtures thereof.

Further, the water insoluble substrates used to form the wipe 620 may also be formed of two or more layers, each having different capabilities. The different capabilities can result from the use of different combinations of materials or from the use of different manufacturing processes or a combination thereof.

By way of example only, the pad 620 is formed of a plurality of pre-moistened wipe sheets 622 wound in a roll defining a central opening or core 624 for mounting on the spindle 626 connected to an output shaft of a drive motor.

Alternately, the roll of wipesheets 622 may be coreless or wound around a hollow core plastic or paper, also having an internal bore sized to non-rotatably coupled to the spindle 624.

By way of example, each of the sheets 622 of the wipe roll are separable from the remainder of the roll along a separation line 628 defined by perforations, cuts, etc. The perforation 628 typically extend all the way through the roll. A fastener, such as a staple, weld or mechanical bond, or adhesive 630 is applied along the separable edge 628 to maintain integrity of the wipe roll 620 or pattern coated on the backside of the roll 620. A pull flap 632 may also be provided at a discontinuous portion of the separable wipe 628 to facilitate tearing off and removing of the outermost sheet from the remainder of the roll 620.

In FIG. 21, a cleaning or grooming apparatus 640 is depicted. The apparatus 640 includes a handle assembly 642 formed of a substantially aesthetically shaped, rigid outer shell which may include one or more resilient material pads 644 to facilitate gripping. A removable or hinged battery cover 646 is attached to one end of the handle 642 to allow access to a battery compartment housed interiorly within the handle assembly 642.

A drive motor means, similar to that shown in FIGS. 6-8, is mounted internally within the handle assembly 642. A slow/fast speed control button 648 and a separate forward and reverse control button 650 are mounted on the handle assembly 642 and connected by switchable contacts to the motor housed within the handle assembly 642 for controlling the activation and deactivation of the motor as well as the direction of rotation of the motor shift.

In this aspect, the output shaft of the motor, not shown, is connected to a key slot or bore in a spindle 650 which is formed of a generally cylindrical body with a first annular flange 652 at one end adjacent to the handle assembly 642 and an enlarging or flange 654 at an opposite end. The flange 654 may have a plurality of radially extending discontinuities to form individual sections which are moveable to allow the mounting of a cleaning or grooming element thereover as described hereafter. A small gap or slot 656 is formed along the longitudinal length of the surface of the spindle 650 to allow a small degree of compression and expansion of the diameter of the spindle 650 to accommodate cleaning attachments.

A number of different cleaning attachments, some suited for general purpose cleaning of many different surfaces and articles, and others more appropriate for grooming or cleaning pets may be mounted on the spindle 650.

One such grooming element 660 is shown in FIGS. 22 and 23. The element 660 is in the form of a mat or pad having a generally cylindrical shape when in a use position. The pad 660, in this aspect is formed of a resilient material, such as an elastomer, rubber, or soft plastic having a substrate 662 from which radially project a plurality of conical or cylindrical bristles 664. The bristles 664 are each resilient themselves and are arranged in close proximity to cover a substantial portion of the exterior of the substrate 662. As shown in FIG. 23, a small nib 666 may optionally be formed on the end of each bristle 664.

The substrate 662 and the bristle 664 may be molded or otherwise formed as a unitary; homogeneous member in either a sheet form or a closed, continuous cylindrical form. The use of a sheet form for the pad 660 enables mounting of the pad 660 over a generally tubular or cylindrical core 670. The core 670 has a longitudinally extending clamp groove formed by opposed clamp surfaces 672 and 674. Clamp surfaces 672 and 674, which form one-half of a dove-tail shape, are adapted for receiving mating angled ends of the substrate 662 which snap-fit into the clamp groove to mount the substrate 662 about the core 670.

Figure 24:
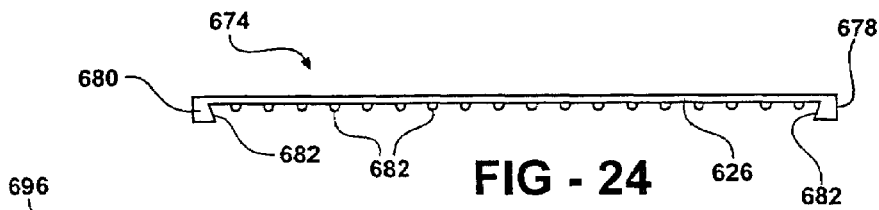
FIG. 24 is a perspective view of a clamp usable with the cleaning element shown in FIG. 22.

A separate clamp 676 may then be mounted over any area or portion of the substrate 662 In one aspect, the clamp 676 is mounted over a void or empty space along a longitudinal portion of the substrate 662, shown in FIG. 22. The clamp 676 which is shown in greater detail in FIG. 24, is formed of a resilient material, such as an elastomer, rubber, soft plastic, etc. and has a strip-like main portion 676 with first and second opposed ends 678 and 680. The strip portion 676 may include inward extending teeth or projections 682 to facilitate engagement with the substrate 662. The first and second ends are adapted to engage recesses formed at the end of the clamp groove in the core 670, as shown in FIGS. 22 and 23 to snap-fit the clamp 674 on the pad 660 so as to cover and retain the ends of the pad 660 in place on the core 670. Optional teeth or projections form complementary to the teeth 682 on the inner surface of the ends 678 and 680 of clamp 674 may be formed in opposite ends of the core 670 to facilitate a secure, but releasable attachment of the clamp 674 to the core 670.

The pad 660 is useful for grooming, cleaning and massaging pets.

Figure 25:
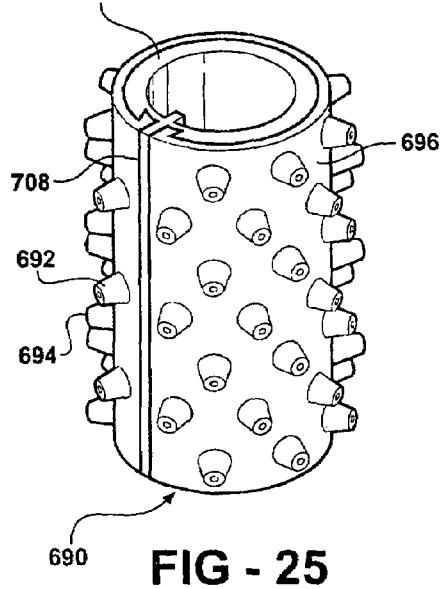
FIG. 25 is a perspective view of another aspect of a cleaning element or mat according to the present invention.
Figure 26:
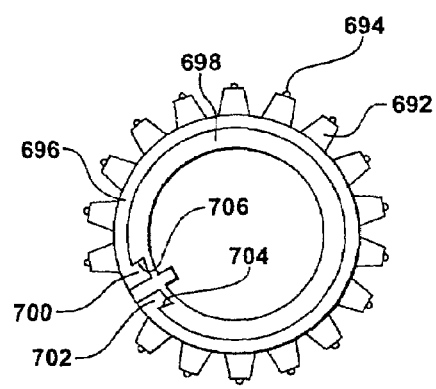
FIG. 26 is an end view of the cleaning element shown in FIG. 25.
Figure 27:
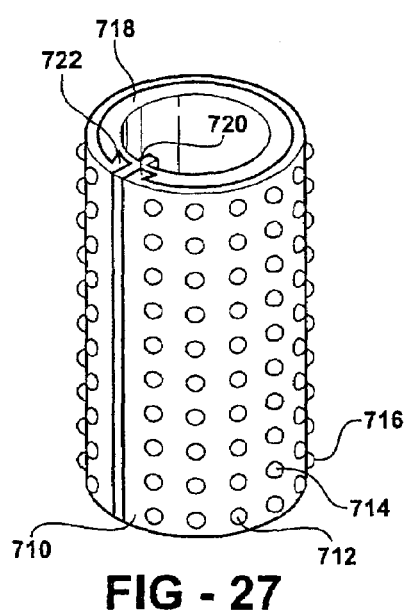
FIG. 27 is a perspective view of another aspect of a cleaning element or mat according to the present invention.
Figure 28:
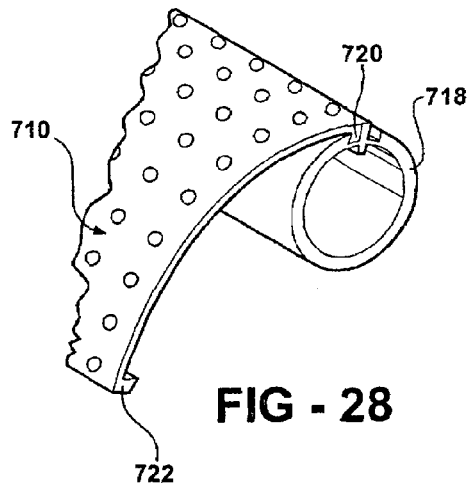
FIG. 28 is a partial, perspective end view of the cleaning element or mat shown in FIG. 27, but depicted in a partially assembled position about a core.

Referring now to FIGS. 25 and 26, there is depicted another mat or pad 690 mountable on the one of the spindles of the present invention. The pad 690 includes a plurality of larger conical shaped projections 692, each terminating in a small nib 694, by example only. The conical shaped projection 692 are somewhat randomly spaced about a substrate 696 with which they form a homogeneous body. The substrate 696 may be formed as a continuous, closed cylindrical member, as shown in FIGS. 26, 27 and 28, as a sheet which wrapped around a tubular or cylindrical core 698. Opposed ends 700 and 702 of the sheet 696 are complementary shaped to inverted angled edges 704 and 706 in a longitudinally extending discontinuity in the core 698 so as to mount the ends of the substrate 696 in the core 698 in a snap-fit. In this aspect, a thin rib 708 extends from the core 698 intermediate the inward facing edges 704 and 706 to separate the ends of the substrate 696 as shown in FIGS. 25 and 26.

The pad 690 is useful in deep grooming and massaging pets.

In FIGS. 27 and 28, there is depicted a similar pad 710 with a plurality of smaller projections 712 closely spaced on a substrate 714. Each projection 712 terminates in an end nib 716, again by example only. The substrate 714 is mounted on a core 718 by means of complementary recesses for receiving the dove-tail shaped ends 720 and 722 of the sheet-like substrate 714 in a snap-in fit in the same manner as described above.

Figure 29:
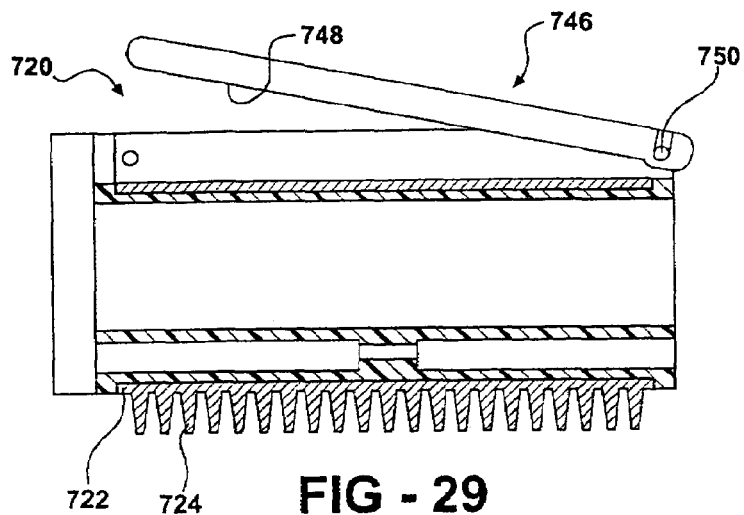
FIG. 29 is a partially cross-section, side elevational view of another aspect of a cleaning element or mat with a pivotal clamp according to the present invention.
Figure 30:
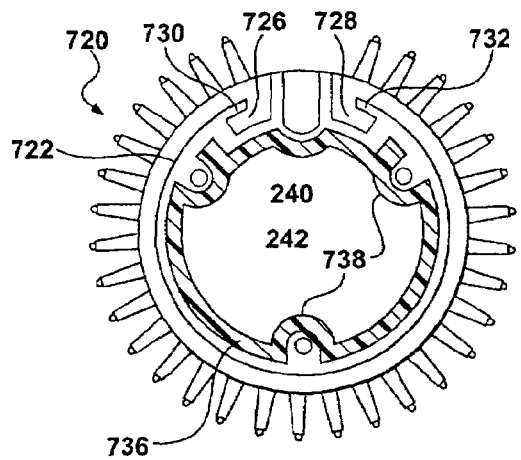
FIG. 30 is a cross-sectional view generally taken along line 30-30 in FIG. 29.

FIGS. 29 and 30 depict an alternate pad 720 according to another aspect of the present invention. The pad 720 includes a substrate 722 from which extend a plurality of generally conical shaped nib 724 similar to the nibs 664 shown in FIG. 22. The substrate 722 is by way of example only, divided in a sheet-like form with opposed ends terminating in fingers 726 and 728 which are spaced from the main portion of the substrate 722 by a slots 730 and 732. The substrate 722 is mountable around a core 736 which has a generally tubular, cylindrical cross section. By way of example only, a plurality, such as three, circumferentially spaced ribs 738 are formed interiorly of the core 736 and extend between opposite ends of the core 736. The rib 738, which may be hollow, provide an orienting feature for mounting the core 736 to a mating motor driven spindle, described hereafter, which has a plurality of circumferentially spaced recesses complimentary to the ribs 738 for slidably receiving the ribs 738 to mount the core 736 on the spindle.

The core 736 includes end fingers 740 and 742 which are circumferentially spaced apart and are adapted for engaging the slot 730 and 732 formed in the core 736 to mount the substrate 722 to the core 736. When the ends 726 and 728 of the substrate 722 are mounted on the core 736, as shown in FIG. 30, the inward facing surfaces of the ends 726 and 728 will be spaced apart by a channel.

A pivotal clamp member 746 in the form of an elongated bar which may have a smooth or toothed inner edge 748 pivotally connected at one end 750 to the core 736 by means of a pivot pin. The clamp 746 is pivotal from a first open position shown in FIG. 29 allowing mounting or dismounting of the substrate 722 on the core 736 and a second closed position in which the inner surface 748 of the clamp 746 engages an inner surface of the core 736. In this closed or second position, the clamp 746 is positioned between the inward facing ends of the substrate 722 thereby preventing dislodgement and separation of the ends 726 and 728 of the substrate 722 from the core 736.

Figure 31:
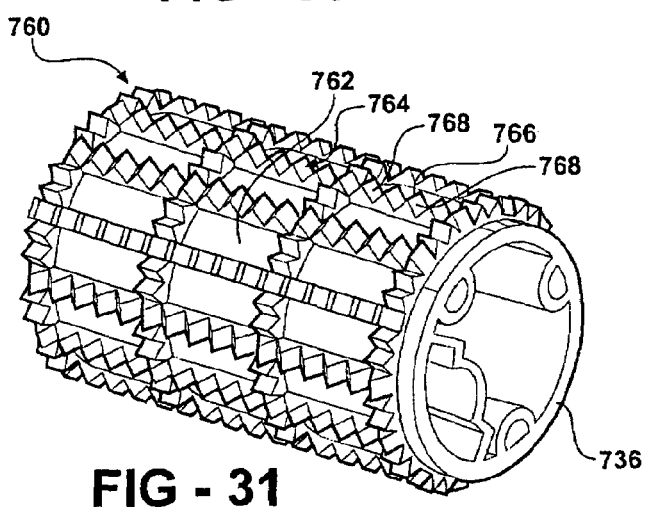
FIGS. 31 and 32 are perspectives of other aspects of cleaning elements or mats according to the present invention.

Referring now to FIG. 31, there is depicted yet another pad 760 which is depicted, by way of example only, as being mounted on a modified core 736. In this aspect, the core 736 defines a substantially continuous cylindrical body.

The pad 760 includes a substrate 762 from which project a plurality of generally saw tooth or triangular shaped projections 764 which are arranged in longitudinally extending rows and laterally extending arcs between adjacent rows. Other patterns, including circular, oval, etc. may also be provided for the projection 764. Each projection 764 is defined by a peak 766 which extends between a valley 768 between an adjacent peak 766.

The projection 764 are formed of a resilient material, such as a soft plastic, rubber, elastomer, etc., to effect a pinching action as the projection 764 are moved across a surface, such as the coat or hair of a pet, etc. During such movement, certain of adjacent peaks 766 move toward each other closing the nominal space between adjacent peaks 766 to effect a pinching action thereby trapping and removing any loose hair or fur from the pet. Such trapped hair, after separation from the pet, is released by the projections 764 when the projections 764 assume their normal spaced position.

Figure 32:
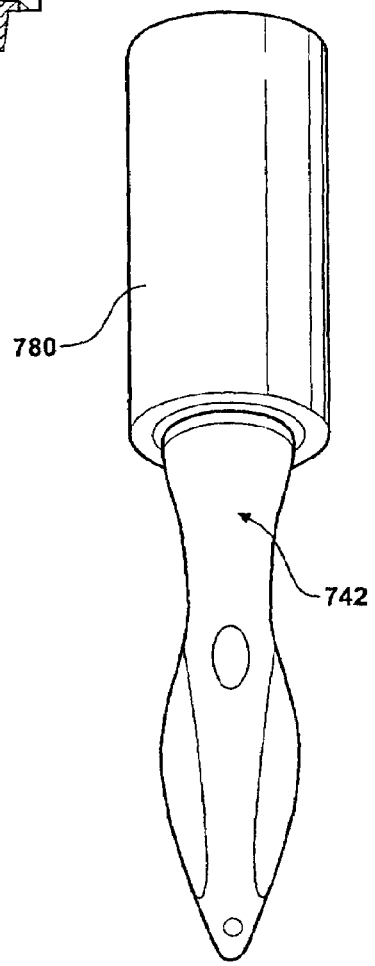

As shown in FIG. 32, the same core 736 and clamp 746 may be employed with a single wipe or roll of wipes 780. The wipes 780 are formed of a soft fabric or paper of single or multiple layers which may be dry for absorbing fluids or provided as a pre-moistened wipe for cleaning, applying medication, deodorizing, etc. The clamp 746 is used to hold the end of the roll of wipes 780 in a unitary manner on the spindle extending from the handle assembly 742. Alternately, the fastener and tab arrangement shown in FIG. 20 may be employed without the need for a separate clamp.

It has been found that using certain of the mats or pads with bristles, such as the pads 660, 690, 710 and 760, will accumulate hair such as pet hair or fur, during extensive use. Several unique hair removal attachments may be provided with the mats to facilitate the removal of hair collected between the bristles on the mat.

Figure 33:
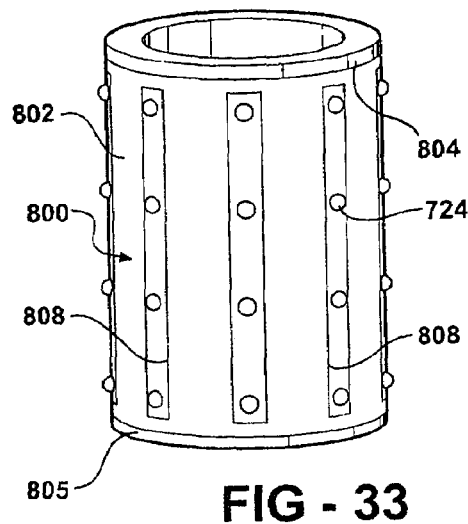
FIG. 33 is a perspective view of a cage mounted about a mat and bristles according to another aspect of the present invention.

One such attachment is shown in FIG. 33 is a wipe 800 having a surface 802 and opposed side edges 804 and 809. The wipe is wound into a tube or wound around a core having a base to mount the wipe 800 over the spindle.

A plurality of apertures, shown by way of example only as being shaped as slots 808, are formed in the surface 802 between the first side edge 804 and the opposed second side edge 805. The slots 808 are mountable over rows of bristles 724 on a mat, such as mat 722 enabling the bristles 724 to project outwardly from the exterior surface of the surface 802 of the wipe 800. This enables the bristles 724 to perform their normal function in stripping or removing hair from a pet, such as a dog or cat, with such removed hair or fur becoming entwined between the bristles.

The wipe 800 can be removed from the mat 722 pulling all of the hair entwined on the bristles 724 from the bristles 724 to effectively remove the hair from the cleaning apparatus.

Figure 34:
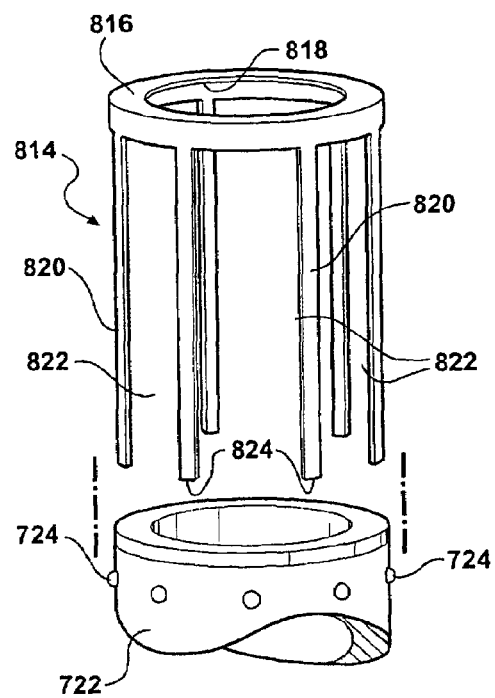
FIG. 34 is an exploded, perspective view of another aspect of a cage mountable over a cleaning element.

FIG. 34 depicts an alternate cage 814 formed of an end wall 816 with an aperture 818 for mounting over the motor driven spindle. A plurality of legs 820 project from the end wall 816 and are circumferentially spaced apart. The spaced legs 820 define openings 822 therebetween which extend around bristles on a mat, such as bristles 724 on mat 722 mounted on a spindle, not shown.

The opposite ends of the legs 820 are flared or otherwise formed with an inward extending edge 824 to snap over the end of the substrate of the mat 722. Removal of the cage 814 from the mat 722 will pull the hair entwined about the bristles 724 from the bristles 724.

The cage 814 can also lock a pre-moistened, dry or dry treated wipe in place on the spindle or on a core.

Figure 35:
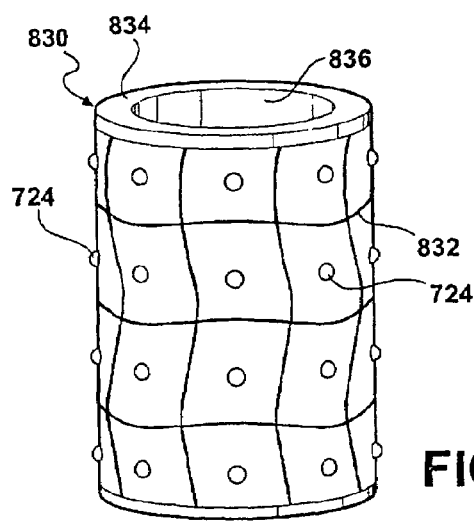
FIG. 35 is a perspective view of yet another aspect of a scrim mountable over a cleaning element.

In FIG. 35, an alternate cage 830 is depicted. The cage 830 is in the form of a thin mesh grid formed of interwoven, widely spaced threads, scrim or an adhesive coated web or tape 832 which extend laterally and longitudinally from an end cap 834 having a central aperture 836 for mounting over the spindle. The threads 832 are mountable over and are disposed adjacent the mat 722. The bristles 724 project through the grid. Removal of the ideally tackified cage 830 from the mat 722 on which it is disposed will enable the threads 832 to pull the hair entwined about the bristles away from the bristles 724 for convenient removal of the collected hair from the mat 722.

Figure 36:
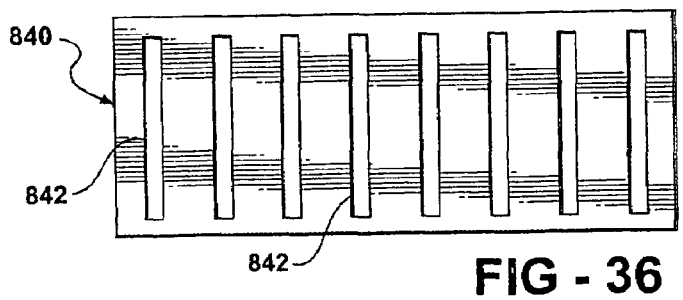
FIG. 36 is an expanded, flat plane view of another cage mountable with the cleaning element according to the present invention.

In FIG. 36, a substrate 840 is disclosed in the form of a sheet formed of foam, sponge, spun lace, non-woven material, terry cloth, etc. A plurality of apertures or slots 842, such as die cut slots, are formed in the substrate 840. The slots 842 are positioned to align with rows of bristles on a mat to enable the bristles to freely pass therethrough. In this manner, the substrate 840 is positioned on the core of the mat adjacent the base of the bristles so as to effect grooming, massaging, hair or fur removal by the bristles and at the same time the application of medicament, cleaning, conditioning, deodorizing fluid, or any combination thereof carried on the substrate 840.

Figure 37:
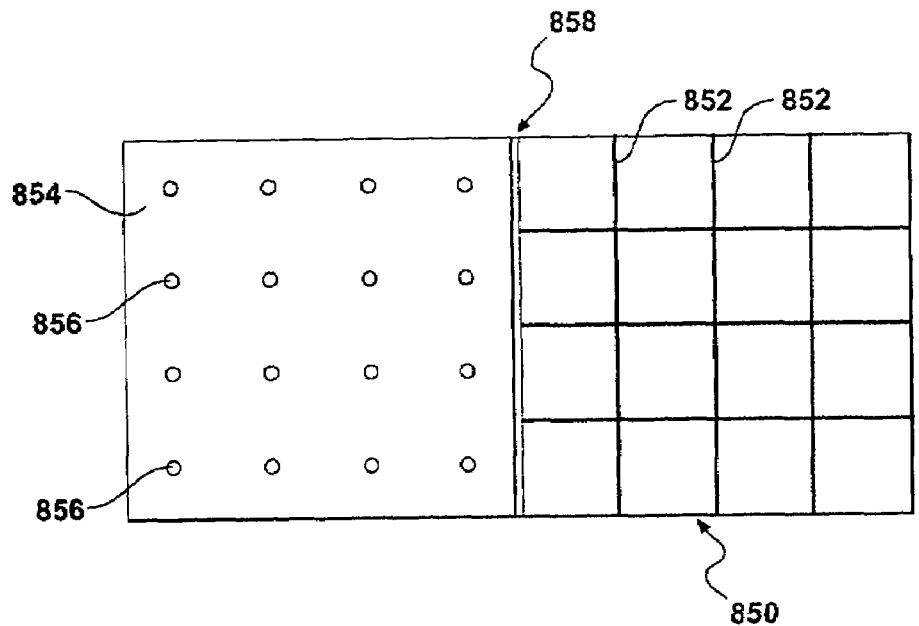
FIG. 37 is a plane view of a flattened cleaning element and integral scrim according to another aspect of the present invention.

In FIG. 37, the scrim or grid 850 formed by interwoven threads 852 is integrally formed with a mat 854 carrying bristles 856. The scrim 850 is connected by a integral, living hinge 858 to the mat 854.

When the substrate 854 is mounted about a mat 854 attachable to a powered rotatable spindle, the scrim is then be wrapped over the bristles 856. Pulling the free end of the scrim or tackified web tape 850 away from the bristles 854 removes entwined hair from the bristles 854.

Figure 38:
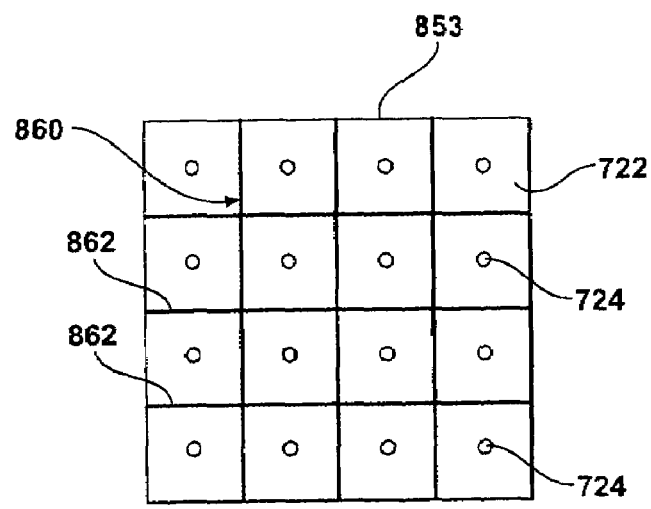
FIG. 38 is a side-elevational view of yet another aspect of a scrim mountable over a cleaning element of the present invention.

Finally, a separate scrim netting or grid 860 is shown in FIG. 38. The scrim netting or grid 860 is formed as a separate element of intertwined threads 862 which are bound about their periphery by peripheral threads 853 to form an integral net. The scrim 860 may be mounted over the bristles 724 on a mat 722 attached to a core to facilitate easy removal of hair entwined on the bristles 724.

It should also be noted that the scrim netting or grid 860 can be wound a plurality of times about a core. The scrim netting or grid may also be formed of a tackified web tape having a releasable adhesive on one surface to retain the tape in a wound roll configuration, but allowing easy separation of the outermost separable portion of the tape from the remainder of the wound tape roll.

Alternately, the scrim netting or grid 860 may be applied in one or more layers, either in a stacked pad like configuration or in a wound roll about a mat having bristles extending from only one surface, such as a generally oval or flat shaped mat in which the bristles project from only one side.

Referring now to FIGS. 39A and 40, there is depicted a cleaning apparatus including the handle 742 as described above and a spindle 863 for receiving one of the mats or cleaning elements also described above. In this aspect, a dual axis motor 864 is mounted in the handle assembly 742. One output shaft 866 of the motor 864 is connected to a gear transmission 868, the output shaft 870 of which is connected to the spindle 863 for rotating the spindle 863.

Another output shaft 872 of the motor 864 drives a vacuum fan assembly 874 also mounted in the handle assembly 842. The vacuum fan, which is vented through exterior slots in the handle casing, generates a vacuum to cause air to flow through an open end 876 of a vacuum head 878 through a passage 879 to an interior chamber 880 in the handle assembly 742. One side portion 882 of the handle assembly 742 overlaying a portion of the chamber 880 is hinged or removable to facilitate removal of collected hair or debris in the chamber or catch tray 880.

In operation, the motor 864 is activated in normal fashion to cause a rotation of the spindle 863 and the attached mat or cleaning element. As the mat or cleaning element is moved along the coat of a pet, such as a dog or cat, the vacuum or suction force generated through the inlet 876 of the vacuum head 878 causes any hair or fur removed from the pet to be drawn through the opening 876 into the vacuum head 878 and from there along the passageway 879 to the collection chamber or catch tray 880.

The collection chamber 880 may also include a removable bin, not shown, which has an opening communicating with the passage 879. The bin can be removed through the cover in the handle assembly 742 to enable emptying of collected hair or debris from the bin. Once emptied, the bin can be replaced into the chamber 880 and the cover 882 closed for further cleaning or grooming activity.

In FIG. 39B, a modified handle 865 and spindle 857 are shown. The spindle 867 receives any of the inventive cleaning elements described previously or hereafter.

A vacuum inlet conduit 869 is unitarily formed with the handle 865 and projects in close proximity to the spindle 867 and any cleaning element mounted on the spindle 867.

A vacuum generator means, such as the vacuum generator 874 shown in FIG. 39A, is mounted within the handle 865 and generates a air flow stream from the inlet to the conduit 869 through vacuum outlet exhaust ports 871 formed on the handle.

A portion of the handle 865 is openable or separable from the remainder of the handle 865 to allow access to a debris collection chamber formed or carried within the handle 865.

Referring now to FIGS. 41 and 42, there is depicted another aspect a motorized cleaning apparatus 900 according to the present invention. The apparatus 900 includes a handle housing 902 with a pivotal or removable end cap 904 allowing access to an internal compartment for storage batteries 908.

A bi-directionally rotatable motor 910 is mountable within the housing 902. The output shaft of the motor is coupled to a transmission or clutch 912. An output shaft 914 projects from the transmission 912 externally at one end of the housing 902. The output of drive shaft 914 is fixedly coupled to a rotatable support, such as a rotatable spindle 915 shown in FIG. 41. Although the spindle can take any cross-sectional shape, by way of example only, the spindle has a generally circular cross-section with a plurality, with three being depicted by way of example only, of longitudinally extending arcuate recesses 920. The recesses 920 are adapted to mate with the longitudinally extending enlargement 738 in a cleaning element core or support as shown in FIG. 30 to fixedly couple the cleaning element to the spindle 916 for bi-directional rotation with the spindle 916.

An end cap 922 may be provided on one end of the spindle 916 to prevent the entry of hair or debris into the typically hollow interior of the spindle 916.

Similarly, a cap with a dependent sidewall 924 is formed at the other end of the spindle 916 and covers the open area or gap between the end of the spindle 916 and the adjacent end of the housing 902 to again prevent the entry of hair or debris into contact with the drive shaft 914.

Suitable control switches or push buttons may be provided on the housing 902 to control the speed and the direction of rotation of the drive shaft 914. A forward and reverse slide or rocker switch 926 is mounted on the housing. The switch activates contacts for microswitches 928 and 930, shown in FIG. 42, are mounted on a circuit board 932 in the housing 902. Conductors or wires extend from the circuit board 932 to the motor 910 to supply electric power from the batteries 908 to the motor 910. A speed control switch 936, depicted as having two speeds, namely, fast and slow is also mounted on the housing 902. The switch 936 is also connected to contacts or a microswitch 938 on the circuit board 932 and, controls the polarity of the electric power supply to the motor 910 to control the direction of rotation of the output drive shaft 914 of the motor 910.

Figure 43:
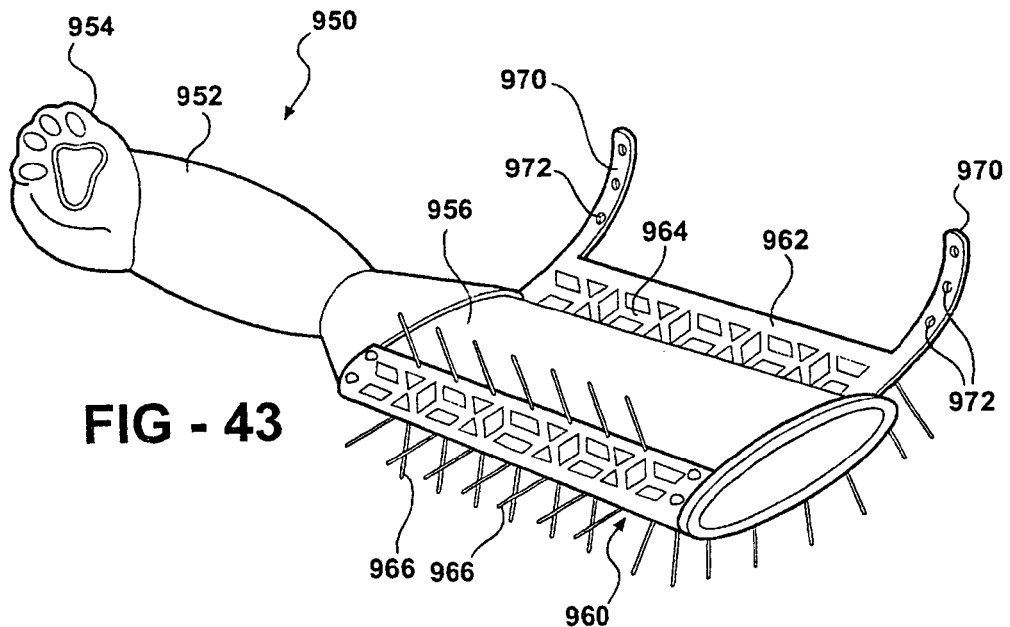
FIG. 43 is a perspective view showing another aspect of a cleaning element applied to a non-rotatable handle and support, with the cleaning element shown in a partially mounted position on the support.
Figure 44:
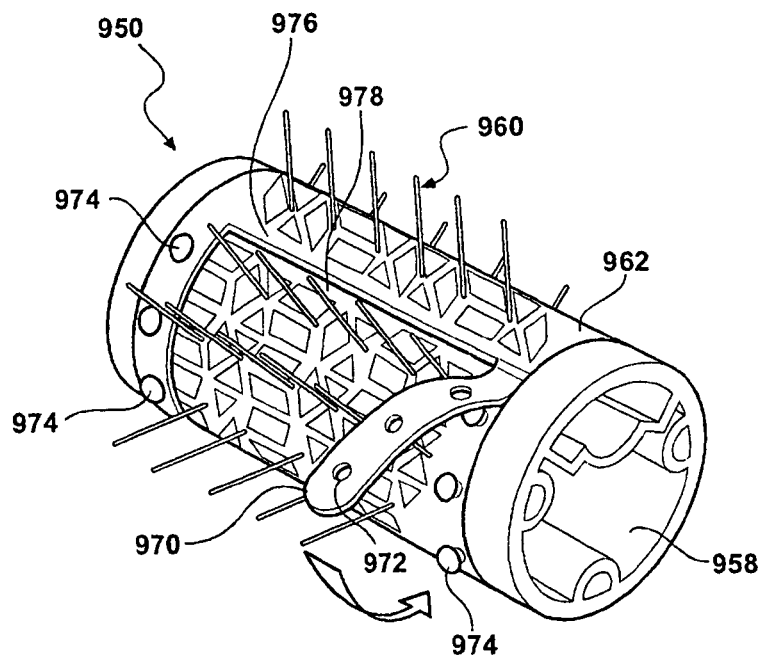
FIG. 44 is a perspective view of another aspect of a cleaning element according to the present invention, also depicted in a partially mounted state.

Referring now to FIGS. 43 and 44, there is depicted another aspect of a cleaning apparatus 950 according to the present invention. In this aspect, the cleaning apparatus 950 is a non-rotatable, generally one piece handle and support assembly including handle 952, end cap 954 and a cleaning element support 956.

However, it will be understood that the cleaning element attachments to be described immediately hereafter may also be applied to any of the motor driven, rotatable cleaning apparatus described above.

In this aspect, a cleaning element 960 is formed, such as by molding, in an elongated, generally flat or planar shape. The cleaning element 960 includes a mat 962 of either solid or discontinuous shape which may have apertures 964 and angularly extending bristles 966. The bristles 966 may extend generally perpendicular from the mat 962 as shown in FIGS. 43 and 44.

The mat 962 is formed of a flexible plastic material so as to enable it to be disposed about a support 956 or 958 and removably secured in place for use.

In FIG. 43, since the support 956 on the cleaning apparatus 950 has a generally oval shape, the mat 962 will when mounted about the support 956 will conform to and assume an oval shape.

In FIG. 44, since the core or support 958 is circular in cross-section, the mat 960 will also assume a circular shape.

FIGS. 43 and 44 depict one means for securing the mat 962 to the core or support 956 or 958. As shown in FIGS. 43 and 44, the mat 962 includes at least one and preferably a pair of spaced straps 970 extending from one edge of the mat 962. The straps 970 include at least one and preferably a plurality of spaced apertures 972. The apertures 972 are adapted to snap over and engage generally mushroom shaped projections 974 extending from an edge portion of the mat. This secures the mat 962 about the support 956 or 958 with opposed edges 976 and 978 of the mat 962 juxtaposed or disposed in side-by-side registry. Alternately, the projections 974 could be formed in the straps and the apertures 972 formed in the mat.

It is also possible to form the apertures or projections directly in the core or support 956 or 958. In this arrangement, the corresponding or mating projections or elements are formed on the straps 970 of the mat 962 or in any portion of the mat 962 to allow easy and removable mounting of the mat 962 on the core support 956 or 958.

Figure 45:
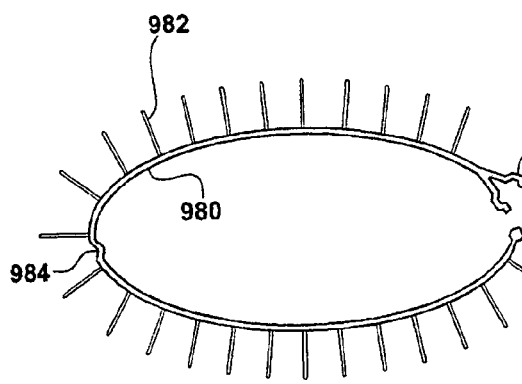
FIG. 45 is an end elevational view of another aspect of a lock means for cleaning elements similar to the cleansing element shown in FIGS. 22, 25-31, 43 and 44.

Another means for attaching a mat about a support is shown in FIG. 45. In this aspect of the invention, a mat 980 having a construction similar to the mat 974 has bristles 982 extending angularly therefrom. A reduced diameter portion or a living hinge 984 is formed longitudinally along one portion of the mat 980. The opposite free ends of the mat 980 are formed with a lock means 986 in the form of a receiver 988 and a projection 990 integrally carried on opposite free ends of the mat 980. The projection is releasably engagable in the receiver 988 to releasably secure the mat 980 about a support.

Figure 46:
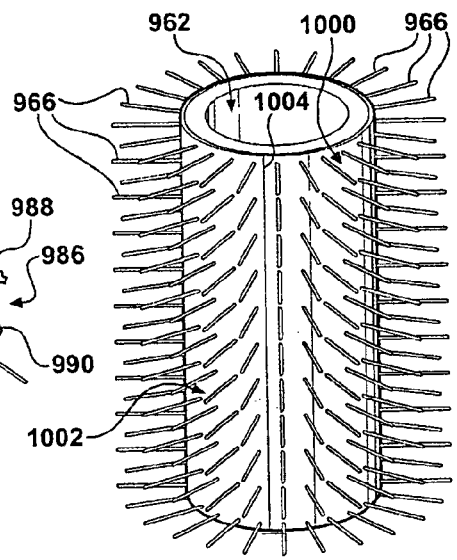
FIG. 46 is a perspective view of another aspect of a cleaning element according to the present invention using a pre-moistened sheet wrapped around bristles extending from a mat.

Referring now to FIG. 46, there is depicted yet another aspect of the present invention in which any one of the cleaning elements described above which has protruding bristles extending from a mat or pad may also carry a fabric sheet in the form of one or more stacked layers of either a separate pad-like stack or wound in a continuous roll about the mat. The sheet, also referred to as a wipe 1000 may be any fabric sheet, such as a spunlace fabric of 20 gsm to 150 gsm non-woven material. The sheet or wipe 1000 may be applied in a dry state for cleaning, polishing, etc., or pre-moistened with any suitable cleaning, conditioning, polishing, conditioning, deodorizing, freshening or medicament preparation or with a water activated, dry composition.

Due to the relatively loose fiber construction of the sheet or wipe 1000, the sheet or wipe may be forced under pressure over the bristles 966 in such a manner that the bristles 966 pierce and extend through the sheet 1000. After the desired wipe layer buildup is provided a smaller portion of the overall length of the bristles 966 will still extend outward from the outermost sheet 1000. The outermost edge 1004 of the sheet 1000 will normally be retained on the mat 962 due to the extension of the bristles 966 through the sheet 1000.

In the case of bristles 966 formed of a rubber or elastomeric material, as compared to the smoother plastic materials employed for the bristles 966, the unique rubber or elastomeric composition of the bristles 966 uniquely combines with the wipe 1000 to provide an expedient means for collecting hair and other debris from a pet's coat as the bristles 966 are moved through the pet's coat and then removing the hair, fur or debris collected by the bristles 966 from the entire mat upon removal of the outermost sheet of the wipe from the core or handle assembly. In addition, where the wipe 1000 is in a pre-moistened state or provided with a tackified or adhesive outer surface, any debris, hair or fur collected by the bristles 966 is held in place by the wipe 1000. This provides a simple cleaning effort since any hair, fur or debris removed from the pet as the bristles 966 are removed through the pet's coat is collected and retained on the bristles 966 and/or the wipe 1000.

The mat 962, which has been formed in a circular or ovalid shape and the ends locked together can be applied over the rotatable or hand held cleaning apparatus. The mat 962 can also be formed in a flat shape and locked around an ovalid or semi-ovalid shaped handle.

In use, the cleaning element 1002 is urged over the surface to be cleaned, such as a pet's coat. The bristles detangle the fur or hair and the outermost surface of the wipe or sheet 1000 cleans or applies a conditioning, cleaning, deodorizing, freshening, medicament, etc., fluid to the pet's coat.

When the outermost sheet 1000 is soiled, the edge 1004 is grabbed and pulled from the mat 962. This separates the outermost sheet 1000 from the bristles 966 until a fresh sheet 1000 is exposed. It should be noted that the act of removing the outermost sheet 1000 also pulls any hair or debris which may have been dislodged by the bristles 966 from the pet's coat away from the mat 962.

Continued grooming and subsequent removal of additional sheets 1000 from the mat 962 will expose more and more of the length of the bristles 966. This causes a deeper penetration of the bristles into the pet's coat for a deeper grooming or massaging effect as well as a more thorough cleaning of the pet's coat for the application of conditioning fluid to the pet's coat.

It will also be noted that a sheet, similar to sheet 1000 may be provided with the length to be applied in one or more separate stacked layers on the mat 980 shown in FIG. 45, with one end of the sheet extending from the receiver 988 to the opposite end disposed adjacent to the projection 990.

The various bristles or projections on the cleaning elements described above as well as the one piece handle and cleaning element support described above can be simply embodied in a one piece brush having a handle portion extending from a unitary cleaning element support from which a plurality of bristles are integrally formed or otherwise fixedly mounted on the support.

A sheet constructed as described above can be wound one or more times around at least a portion and preferably the entire circumference of the bristles. Depending upon the looseness of the fabric, the bristles can pierce and extend through the sheet. Alternately, as described above, apertures may be formed in the sheet to allow for passage of the bristles therethrough.

In this aspect, once the sheet or wound roll of sheets has been completely used, the entire brush can be discarded.

Figure 47:
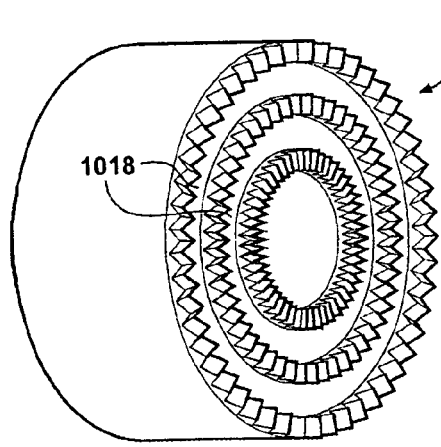
FIG. 47 is a top perspective view of another aspect of a cleaning apparatus according to the present invention.
Figure 48:
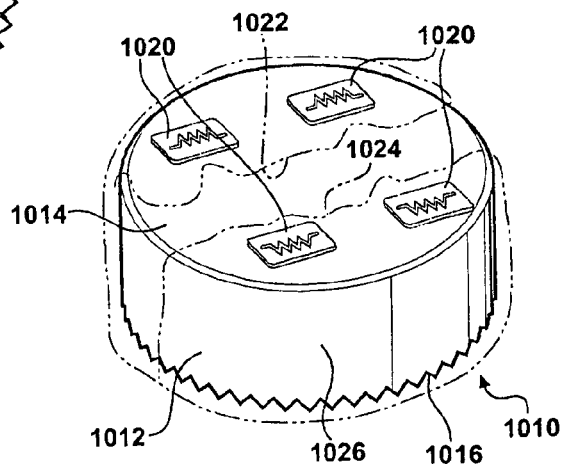
FIG. 48 is a bottom perspective view of the cleaning apparatus shown in FIG. 47.

Referring now to FIGS. 47 and 48, there is depicted another aspect of a cleaning apparatus 1010 according to the present invention. The apparatus 1010 is in the form of a brush having a hand gripable generally rigid body 1012 which is formed with a top surface 1014 and a bottom surface 1016. A plurality of cleaning elements, such as rings of alternating peaks and valleys, all denoted by reference number 118, or bristles, not shown, may be integrally molded or attached to the surface 1016. Peaks and valleys are similarly constructed as the peaks and valleys of the cleaning element 760 shown in FIG. 31. The rings 1018 are formed of a resilient material and flex upon contact with a pet's coat to grab or trap hair or fur and then safely pull the loose hair or fur from the pet's coat during movement of the cleaning element 1010 over the pet's coat.

Gripping means or elements 1020 are mountable on the surface 1014 of the cleaning element 1010. The gripping elements 1020 may be integrally formed with the surface 1014 or secured thereto as a separate element by fasteners, adhesive, etc. The gripper elements are adapted for receiving edges 1022 and 1024 of a sheet or wipe 1026, as described above. The sheet or wipe 1026 extends in one wrapping arrangement around the cleaning element 10 and covers substantially all of the peaks and valleys 1018. Due to the very soft, flexible nature of the wipe 1026, the wipe 1026 will conform to the shape of the peaks and valleys thereby allowing the peaks and valleys to resiliently move to trap and pull hair or fur from a pet's coat while at the same time applying any applied fluid on the wipe 1026 to the pet's coat.

Referring now to FIGS. 49 and 50, there is depicted two aspects of protective cap or enclosure which can be used to surround a cleaning element of the present invention such as a pre-moistened sheet 1000 wound around the support section of the cleaning apparatus 1030.

In the aspect shown in FIG. 49, the protect cap or closure 1032 is formed as a cylinder having an ovalid or circular cross section with a closed end 1034 and an opposed open end 1036. A sidewall 1038 extends between the ends 1034 and 1036.

The inside diameter of the cap 1032 is sized to easily slide over the sheet 1000 and any bristles extending through the sheet 1000. The end 1040 of the cap 1032 adjacent the open end 1036 is sized to form a friction or pressure fit with a collar 1042 formed on the cleaning apparatus 1030 between a handle and the cleaning element support portions of the cleaning apparatus 1030. In this manner, the cap 1032 may be sealingly attached to the collar 1042 to sealingly enclose and prevent evaporation of the pre-applied fluid on the sheet 1000.

Another aspect of the a protective cap 1050 is depicted in FIG. 50. In this aspect, the protective cap 1050 include first and second complementary sections 1052 an 1054 which are hingedly connected, such as by a living hinge 1056 integrally formed between the sections 1052 and 1054.

The sections 1052 and 1054 have an ovalid or circular cross section so as to snugly enclose the sheet 1000 and any bristles extending through the sheet 1000 to sealing encompass the sheet 1000 and prevent evaporation of any fluid pre-applied to the sheet 1000.

Suitable lock means, not shown, may be carried on the sections 1052 and 1054 to enable the sections 1052 and 1054 to engage in a snap connection forming a seal about mating peripheral edges of the sections 1052 and 1054.

Figure 52:
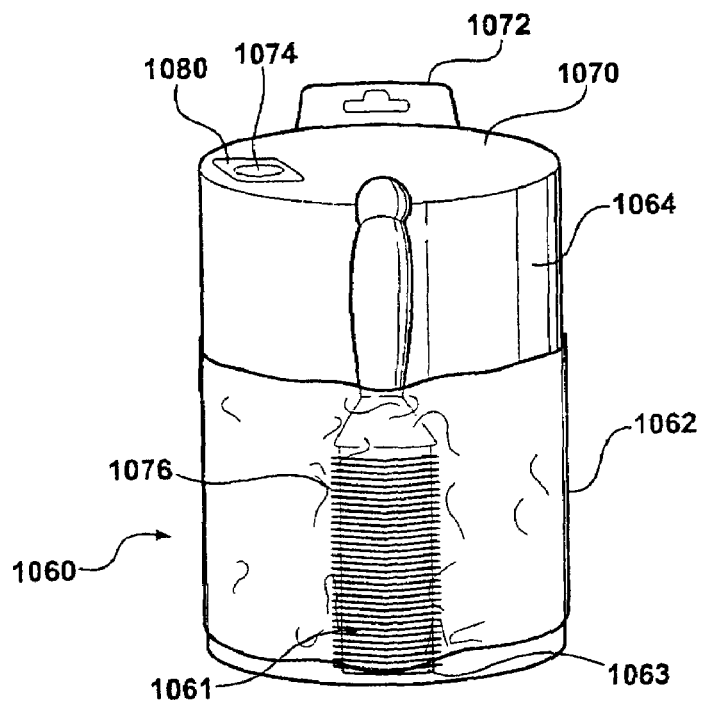

Refer now to FIGS. 51 and 52, there is depicted another container 1060 which may be used to store the cleaning element of the present invention during shipping from its initial manufacturing site to a final assembly site wherein the cleaning, deodorizing or medicament solution is added to the wipe, as well as providing a convenient container for sealingly enclosing the cleaning element between uses by the consumer while preventing evaporation of any fluid applied to the wipe on the cleaning element.

As shown in FIG. 51, the container 1060 includes, by example only, a two part container including a lower container 1062 and an upper container 1064 which are sealingly joinable by suitable means, including a pressure fit, a snap fit, sealing elements, threads, and combinations thereof The lower container 1062 is a closed ended container having an open top end 1066.

The upper container 1064 also has an open end 1068 adapted to fluidically communicate with the open end 1066 of the lower container 1062. The opposite end 1070 of the upper container 1064 is closed. A hanger 1072 may optionally be formed or mounted on the closed end 1070 of the upper container 1064 for ease of handling, mounting during display in a store, etc.

An aperture 1074 is formed in the upper container 1064 in either a side wall container or, optionally, in the end 1070. The aperture 1074 provides an easy means for applying fluid 1076, in FIG. 52, into the interior of the container 1060.

A moisture proof, seal member 1080, such as a rubber stopper plastic threaded cap or an adhesive backed tape or label is removably or permanently applied over the aperture 1074 after the fluid 1076 is poured into the container 1060.

In use, once the cleaning element 1061 having a wipe according to one of the aspects of the invention described above is assembled, it is placed within the lower container 1062. The upper container 1064 is then sealingly joined to the lower container 1062. It should be noted in this state, the wipe 1063 on the cleaning element 1061 is dry. The sealed container 1060 can then be shipped to a final assembly site. The sealable cover 1080 is removed exposing the aperture 1074. The desired solution, i.e., cleaning, deodorizing, medicament, etc., is then poured through the aperture 1062 into the interior of the container 1060 wherein it is absorbed by the wipe 1063. The cover 1080 is then sealingly applied over the aperture 1070 to seal the interior of the container 1060. Alternately, the container is shipped to plant without the seal 1080 and unclosed. It is then filled and the closing means installed.

Only enough liquid is poured through the aperture 1074 to be absorbed by the wipe 1063.

Once the now complete cleaning assembly has been purchased by a consumer, in order to use the cleaning apparatus 1061, the consumer separates the upper container 1064 from the lower container 1062 and removes the cleaning apparatus 1061. After use has been completed, the consumer reinserts the cleaning apparatus 1061 into the lower container 1062 and sealingly attaches the upper container 1064. This forms a closed environment for the cleaning element 1061 to prevent evaporation of the fluid applied to the wipe 1063.

Refill wipe cartridges, as described above, may be subsequently purchased by the consumer. The replacement cartridges can be removed from the sealable enclosure, such as a flexible, sealable pouch or container, and mounted on the cleaning apparatus 1061 as a replacement for a used cleaning element and wipe 1063. The refilled cleaning apparatus 1061 is then reinserted into the container 1060.

Figure 53:
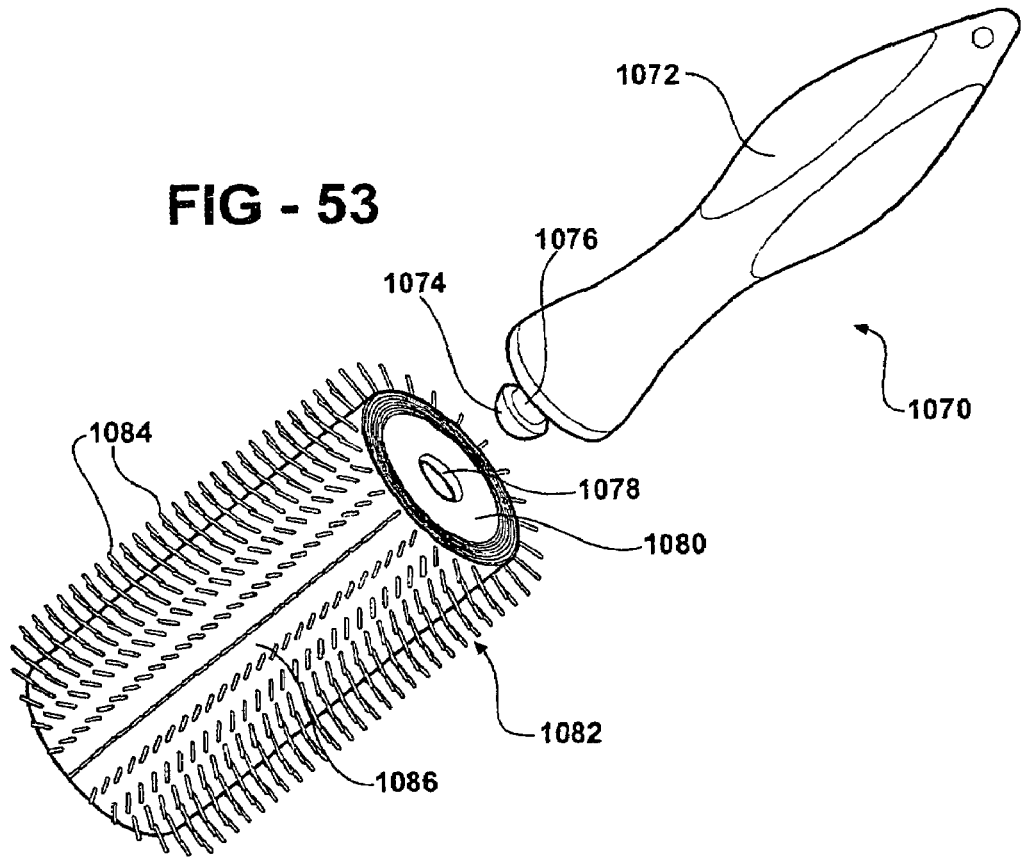
FIG. 53 depicts another perspective view of the apparatus.

Refer now to FIG. 53, there is depicted yet another aspect of a cleaning apparatus 1090 according to the present invention. In this aspect, the cleaning apparatus 1090 includes a handle 1092 of any suitable shape. The handle 1072 may be hollow or solid. One end of the handle 1092 is formed with one part of a locking means, such as a mushroom shaped, enlarged cap or head 1094. The head 1074 extends from a smaller diameter neck 1096 which integrally extends from one end of the handle 1092. The head 1094 is adapted to snap into and lock through an aperture 1098 in an end wall 1100 of cleaning element denoted generally by reference number 1102. The end wall 1100 may be a part of a generally tubular support or core having a circular or ovalid cross-section. The aperture 1098 has a slightly smaller diameter than the outer diameter of the head 1094 to allow the head 1094 to be deformably inserted through the aperture 1098 and then expand outward to its normal shape. This positions the neck 1096 in the aperture 1098.

The diameter of the aperture 1098 and the outer diameter of the neck 1096 may be complementarity sized for fixed or rotative movement between the handle 1092 and the cleaning element 1102.

By way of example only, the cleaning element 1102 is depicted as having a plurality of outwardly extending bristles or projections 1104 and a cleaning sheet 1106, such as a non-woven fabric, as described above. The sheet 1106 may be provided in a single layer or in a plurality of layers about at least a portion and preferably the entire periphery of the core 1100. The sheet 1106, when wound into a plurality of turns about the core 1100, may be provided with separable individual sheets, as described above.

It will also be noted that in all aspects of the invention which mount a motor in the cleaning apparatus, a sound proofing material, such as the foam material used to form compressible ear plugs, which may have a high noise filtration (NRR) of 33 decibels, for example, may be mounted on or applied to the exterior or interior of the housing 420 depending on the suitability of the selected material for use as an external gripping surface or, when mounted internally within the handle, having suitable temperature resistance, electrical and vibration absorbing insulative properties.

What is claimed is:

1. A cleaning apparatus comprising:
  a cleaning element support;
  a cleaning element removably disposed about said support;
  a handle coupled to the support;
  a slot formed along the support;
  wherein opposed ends of the cleaning element are selectively disposed in said slot for securing the cleaning element in fixed position on the support; and
  clamp means carried on the support for moving between a first open position and a second closed position, said second closed position having the clamp means positioned in said slot and between said disposed opposed ends of said cleaning element for preventing dislodgement thereof from said slot; wherein said support includes a core having circumferentially spaced interior formed ribs for selectively mating with circumferentially spaced recesses of a rotatable spindle extending from said handle.

2. The apparatus of claim 1 further including means carried on the opposed ends of the cleaning element for releasably mounting said opposed ends in said slot.

3. The apparatus of claim 1 wherein:
the cleaning element extends over substantially an entire exterior surface of the support.

4. The apparatus of claim 1, wherein said support has a cylindrical configuration.

5. The apparatus of claim 1, wherein said cleaning element has an exterior surface with a plurality of cleaning element projections fixed thereto and radially projecting therefrom.

6. The apparatus of claim 1, wherein said support has a cylindrical configuration and said cleaning element is in the form of a sheet.

* * * * *